US00RE39060E

(19) United States
(12) Reissued Patent
Okui et al.

(10) Patent Number: US RE39,060 E
(45) Date of Reissued Patent: Apr. 11, 2006

(54) POWER SUPPLY DEVICE AND AIR CONDITIONER USING THE SAME

(75) Inventors: Hiroshi Okui, Kusatsu (JP); Masanori Ogawa, Kusatsu (JP)

(73) Assignee: Matsushita Electric Industrial Co., Ltd., Osaka (JP)

(21) Appl. No.: 10/354,190

(22) Filed: Jan. 30, 2003

Related U.S. Patent Documents

Reissue of:
(64) Patent No.: 6,181,583
Issued: Jan. 30, 2001
Appl. No.: 09/484,025
Filed: Jan. 18, 2000

(30) Foreign Application Priority Data

Jan. 19, 1999 (JP) ..... 11-010155

(51) Int. Cl.
*H02M 1/12* (2006.01)
*H02M 5/42* (2006.01)

(52) U.S. Cl. ..... 363/45; 363/89
(58) Field of Classification Search ..... 363/39, 363/44, 45, 46, 84, 89, 125, 126, 127
See application file for complete search history.

(56) References Cited

U.S. PATENT DOCUMENTS 4,831,508 A 5/1989 Hunter
5,383,109 A 1/1995 Maksimovic et al.

(Continued)

FOREIGN PATENT DOCUMENTS

| | | |
|---|---|---|
| DE | 4219222 | 1/1993 |
| DE | 4430394 | 1/1995 |
| EP | 0586885 | 3/1994 |
| EP | 0932249 | 7/1999 |
| GB | 2258958 | 2/1993 |
| GB | 2289581 | 11/1995 |
| JP | 57-3579 | 1/1982 |
| JP | 58207870 | 12/1983 |
| JP | 63202271 | 8/1988 |
| JP | 9-266674 | * 10/1997 |
| JP | 10-79630 | 3/1998 |
| JP | 2763479 | * 3/1998 |
| JP | 10-174442 | * 6/1998 |
| JP | 10201286 | 7/1998 |
| WO | 98/16993 | 4/1998 |

OTHER PUBLICATIONS

English Language Abstract of WO 98/16993.
English Language Abstract of JP 10–79630.
English Language Abstract of JP 10–201286.
English Language Abstract of JP 9–266674.
English Language Abstract of JP 10–174442.
Bartholoméüs et al., "A 3kW Unit–Power–Factor Multilevel Rectifier Based on a Doubled–Boost Converter", dated Sep. 8, 1997.
English Language Abstract of JP 58–207870.
English Language Abstract of JP 63–202271.
English Language Abstract of JP 9–266674.
English Language Abstract of JP Application No. 05186491.
English Language Abstract of JP 57–3579.

*Primary Examiner*—Matthew V. Nguyen
(74) *Attorney, Agent, or Firm*—Greenblum & Bernstein, P.L.C.

(57) ABSTRACT

This invention provides a power supply device capable of widening a conduction period of an input current by a simple control to improve a power factor, and reducing a harmonic distortion of the input current The power supply device comprises a rectifier circuit, a reactor, a power factor correction circuit having switching elements, capacitors and a reverse-current blocking rectifier elements, a smoothing capacitor for smoothing an output voltage of the power factor correction circuit to obtain a DC voltage, a pulse signal controller generating and outputting a pulse signal for turning on and off the switching elements, and a driver for receiving the pulse signal to drive a switching elements of the power factor correction circuit.

23 Claims, 34 Drawing Sheets

U.S. PATENT DOCUMENTS 5,598,326 A * 1/1997 Liu et al.
5,654,591 A 8/1997 Mabboux et al.
5,734,562 A * 3/1998 Redl
5,751,561 A * 5/1998 Ho et al.
5,886,506 A 3/1999 Ozawa
5,915,070 A 6/1999 Takekawa et al.

* cited by examiner

POWER SUPPLY DEVICE AND AIR CONDITIONER USING THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a power supply device which converts an alternating current into a DC, and reduces a harmonic distortion of an input current so as to improve a power factor.

2. Description of the Related Art

Conventionally, a capacitor input type rectifier circuit has been used as an AC-to-DC converter circuit in various fields. The capacitor input type rectifier circuit inputs an AC voltage to a diode rectifier circuit so as to obtain a ripple voltage output, and smoothens the ripple voltage output by a capacitor so as to obtain a DC voltage. However, in the capacity input type rectifier circuit, a conduction period of an input current becomes narrow, and then, a power factor is worsened, and further, a reactive power is much. For this reason, it is not possible to effectively use a power, and the input current contains much harmonic distortions, as a result, there is a problem of fault to equipment connected to the identical power supply device. In order to solve the above problem, conventionally, a power supply device having a circuit configuration as shown in FIG. 31A has been developed as a technique for improving a power factor to reduce a harmonic distortion.

As shown in FIG. 31B, when a rectifier circuit 103 converts an AC voltage Vin from an AC power supply 101 into a ripple output voltage, the power supply device can relieve a rush of the input current Iin by an inserted reactor 102. As a result, the conduction period becomes widened, and thereby it is possible to improve a power factor and to reduce a harmonic distortion contained in the input current Iin.

As described above, the conventional power supply device shown in FIG. 31 has been used in various apparatuses because only passive components having a simple construction are inserted so as to improve a power factor.

In recent years, a power supply device as shown in FIG. 32A has been developed, which improves a power factor using active elements. The power supply device shown in FIG. 32A will be described below. In FIG. 32A, a control circuit 109 generates and outputs a signal for turning on and off a switching element 107 at a high frequency so as to form an input current into a shape of a sine wave. A reactor 106 is a high-frequency compliant reactor for forming the input current into a shape of sine wave together with the switching clement 107. A diode 108 prevents an electric change changed to a smoothing capacitor 104 from reversely flowing when the switching element 107 is in an on state.

The following is a description on an operation of the above power supply device. The control circuit 109 compares a detection current from an input current detecting circuit (not shown) with a sine wave-shaped reference waveform prepared based on a power supply voltage waveform, and then, generates and outputs a pulse signal for controlling an on/off of the switching element 107 so as to form the input current into a shape of a sine wave. The switching element 107 makes an on/off operation in accordance with the pulse signal to cause the reactor 106 to be in a short circuit or in an open circuit repeatedly so that the input current is brought close to the reference waveform. As a result, as shown in FIG. 32B, it is possible to obtain a sine wave-shaped input current substantially similar to the alternating voltage Vin of the AC power supply 101, and thus, to bring a power factor close to t. Further, it is possible to greatly reduce a harmonic distortion contained in the input current Iin.

Moreover, there is a power supply device which remarkably simplifies a switching control so as to improve a power factor, as disclosed in Japanese Patent Laid-open Publication No. 9-26674, 10-174442, or Japanese Patent No. 2-763479.

These power supply devices will be described below with reference to FIGS. 33 and 34.

In a power supply device shown in FIG. 33A, a reactor 102 is used for a low frequency. A control circuit 110 outputs a pulse signal for turning on the switching element 107 for a predetermined time in synchronous with a zero cross point of the AC power supply 101. Whereby a current for short-circuiting the AC power supply 101 flows via the rectifier circuit 103, the reactor 102 and the switching element 107, and thereby, the input current flows from the zero cross point of the AC power supply 101. Then, when the switching element 107 becomes an off state, a current flows through the rectifier circuit 103, the reactor 102, a reverse-current blocking rectifier element 109 and the smoothing capacitor 104. As a result, it is possible to be make wide a conduction period to improve a power factor. Further, the control circuit 110 can output the pulse signal for turning on the switching element 107 after a delay of predetermined time from the zero cross point of the AC power supply 101. The delay time may be set in accordance with a magnitude of load, and thereby, it is possible to obtain an optimum power factor for each load.

A power supply device shown in FIG. 34A includes capacitors 120a and 120b for improving a power factor. A control circuit 111 outputs a pulse signal for turning on a bi-directional signal 115 for a predetermined time in the vicinity of the zero cross point of the AC power supply 101. Thus a charging current flows to the capacitor 120a or 120b via a reactor 102 and a rectifier circuit 103. A phase of the charging current is advanced, it is therefore possible to make early a rise of the input current. Then, when the bi-directional switch US becomes off, an input current flows through the reactor 102, the rectifier circuit 103 and a smoothing circuit 104. Consequently, a conduction period of the input current can be widened to improve a power factor.

Moreover, in the power supply device shown in FIG. 34A, the control circuit 111 can change an output voltage value by changing a pulse width of the pulse signal More specifically, the power supply device shown in FIG. 34A is operated as a full-wave rectifier circuit when the bi-directional switch is off, and is operated as a voltage doubler rectifier circuit when the bi-directional switch is in an on state.

Therefore, by changing a pulse width of the pulse signal, the control circuit 111 can change an output voltage within a range which is more than a voltage obtained a full-wave rectification, and is lower than a voltage obtained by a voltage doubler rectification.

However, in the above power supply device shown in FIG. 31A, its improvement effect is low although the power supply device can improve a power factor with a simple construction and a sufficient power factor can not be obtained. Since a reactor value must be made large in order to obtain high power factor with the circuit construction, it causes a problem that components would be made into a large size and a loss would simultaneously increase.

Even though the above power supply device shown in FIG. 32A can form the input current into a shape of sine wave and control a power factor to approximately 1, the power supply device has the following problems. More specifically, the control becomes complicate, and a loss in the switching element 107 is increased due to high frequency switching accompanying with waveform shaping, and further, a switching noise increases. Therefore a powerful filter circuit is required for restricting the aforesaid loss. This causes a cost increase, an increase of loss in the filter circuit, and finally efficiency deterioration as a whole.

The above power supply device shown in FIG. 33A has the following problems although it can remarkably simplify a switching control. More specifically, in particular, a current waveform becomes a non-continuous state as shown to FIG. 33B in a low load, or is too advanced: for this reason, a sufficient power factor can not obtained. Further, an output timing of the pulse signal is delayed for a predetermined time from the zero cross point of the AC power supply, and thereby, an optimum power factor is obtained in a low load. However, the control becomes complicate, because both of a delay time and a pulse width must be controlled. Further, in the case where the above power supply device is applied to an air conditioner or the like, the reactor is made into a large size in inputting 200V, and then, a loss is increased in the large-sized reactor. Further, since a voltage applied to switching means becomes high, a component having a high withstand voltage is required. As a result, the component is made into a large size, and a switching loss becomes great in the switching element 107.

In the above power supply device shown in FIG. 34A, it is possible to remarkably simplify a switching control, and to obtain high power factor in a low load. Further, it is possible to increase an output voltage within a range which is more than a voltage obtained by a full wave rectification, and is lower than a voltage obtained by a voltage doublet rectification. This power supply device however has the following problems. More specifically, as shown in FIG. 34B, when an output voltage increases, a voltage boost ratio becomes higher, and the power supply device is close to the voltage double rectifier circuit Consequently a sufficient power factor can not be obtained. It is impossible to obtain an output voltage more than a voltage obtained by the voltage doubler rectification.

SUMMARY OF THE INVENTION

The present invention has been made in order to solve the aforesaid problem in the prior art. It is, therefore, an object of the present invention to provide a power supply device which can obtain high power factor with a simple construction and control without carrying out high frequency switching, prevent an increase of loss in a filter circuit resulting from an increase of loss in a switching element and an increase of switching noise, and can restrict a harmonic and a loss.

Further, another object of the present invention is to provide a power supply device which can obtain high power factor in the, whole loads even if a switching control is simplified, and can improve a power factor by a simple control.

Further, :mother object of the present invention is to provide an power supply device which can prevent an increase in a size of reactor in an input of 200V, and an increase of loss resulting from the increase of the reactor size, and can prevent a switching element from being made into a large size. In addition, another object of the present invention is to provide a power supply device which can greatly change an output voltage even if a switching control is simplified, and can obtain a sufficient power factor.

To achieve the above objects, according to the first aspect, the present invention provides a power supply device. The device comprises a rectifier unit, a reactor, a power factor correction unit, an pulse signal controller and a switching driver.

The rectifier unit rectifies an output voltage of an AC power supply to convert the voltage into a DC voltage. The reactor is connected to the rectifier unit. The power factor correction unit inputs an output voltage of the rectifier unit via the reactor. The power factor correction unit includes a switching circuit, a capacitor circuit can a reverse-current blocking rectifier element. The switching circuit comprises a plurality of switching elements connected in series and turning on or off to change a current path in the power factor correction unit. The capacitor circuit comprises a plurality of capacitors connected in series. The reverse-current blocking rectifier element prevents the chime in the capacitors from flowing reversely when the switching circuit turns on. The switching circuit and the capacitor circuit is arranged in parallel. At lest one of connection nodes between the switching elements is connected to one connection node between the capacitors. Ends of the switching circuit is connected to ends of the capacitor circuit via the reverse-current blocking rectifier element. The pulse signal controller generates and outputs a pulse signal to turn on and off each switching element of the power factor correction unit. The switching driver receives the pulse signal to drive the switching circuit of the power factor correction unit based on the received pulse signal.

The pulse signal controller may change a control method of the pulse signal in accordance with a zero cross point of the AC supply voltage, magnitude of the AC supply voltage, status of a load, or the frequency of the AC supply voltage. For example, the pulse signal controller may select one control method from a plurality of methods for controlling the pulse signal in accordance with scants of a load.

In the power supply device according to the present invention, a wide conduction period can be obtained to restrict a harmonic distortion, and realize a power supply device which can reduce a switching noise and a loss by a simple construction and control. Further the power supply device according to the present invention provides a low-loss air conditioner which has high power factor and can restrict a harmonic distortion.

An air conditioner with high efficiency, low harmonic and low loss also can be provided by applying thereto the power supply device according to the present invention.

DETAILED DESCRIPTION OF THE PREFERRED EMBODIMENTS

Figure 1:
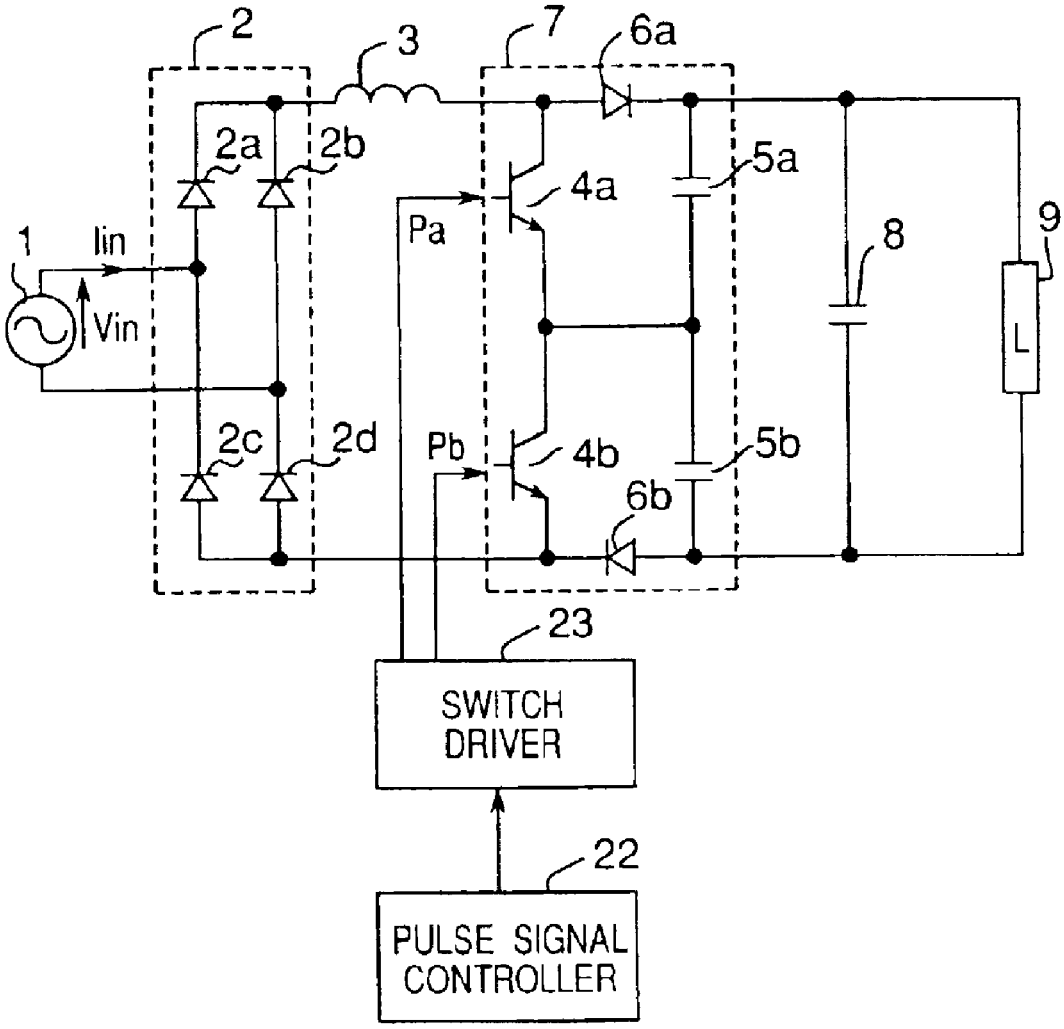
FIG. 1 is a circuit diagram showing a construction of a power supply device according to a first embodiment of the present invention.

Preferred embodiments of a power supply device according to the present invention will be described below to detail with reference to the accompanying drawings. In all drawings, like reference numerals are used to designate the identical or equivalent components or portions.

First Embodiment

FIG. 1 is a circuit diagram showing a construction of a power supply device according to one embodiment of the present invention. In FIG. 1, The power supply device comprises a rectifier circuit 2 for rectifying an AC voltage from an AC power supply 1 to output a rectified ripple voltage, a reactor 3 for improving a power factor, a power factor correction circuit 7 and a smoothing capacitor 8 for smoothing an output voltage of the power factor correction circuit 7 to supply the voltage to a load 9. The rectifier circuit 2 is composed of a plurality of rectifier elements 2a, 2b, 2c and 2d. The power factor correction circuit 7 is composed of two switching elements 4a and 4b connected in series, and two capacitors 5a and 5b connected in series, and two reverse blocking rectifier elements 6a and 6b. An intermediate point of the serial connection of two switching elements 4a and 4b is connected with an intermediate point of the serial connection of two capacitors 5a and 5b. The switching element 4a and the capacitor 5a are connected via the reverse blocking rectifier element 6a. The switching element 4b and the capacitor 5b are connected via the reverse blocking rectifier element 6b.

In this case, self arc-extinguishable semiconductors such as a power transistor, a power MOSFET, an IGBT are used as these switching elements 4a and 4b. Moreover, to give an example of load, there are a heating wire, an inverter and lighting equipment and motors which are connected to the inverter to operate etc.

Further, the power supply device includes a pulse signal controller 22 which generates and outputs a pulse signal for driving the switching elements 4a, and 4b, and a switching driver 23 which receives a pulse signal from the pulse signal controller 22 to drive the switching elements 4a and 4b. The pulse signal controller 22 comprises a general logic circuit or a microprocessor. The switch driver 23 comprises a transistor, , a dedicated IC or a Photo-coupler for electrical insulation.

An operation of the pulse signal controller 22 will be described below. The pulse signal controller 22 generates and outputs a pulse signal for turning on at least one of two switching elements 4a and 4b in a half period of AC power supply 1.

Figure 2:
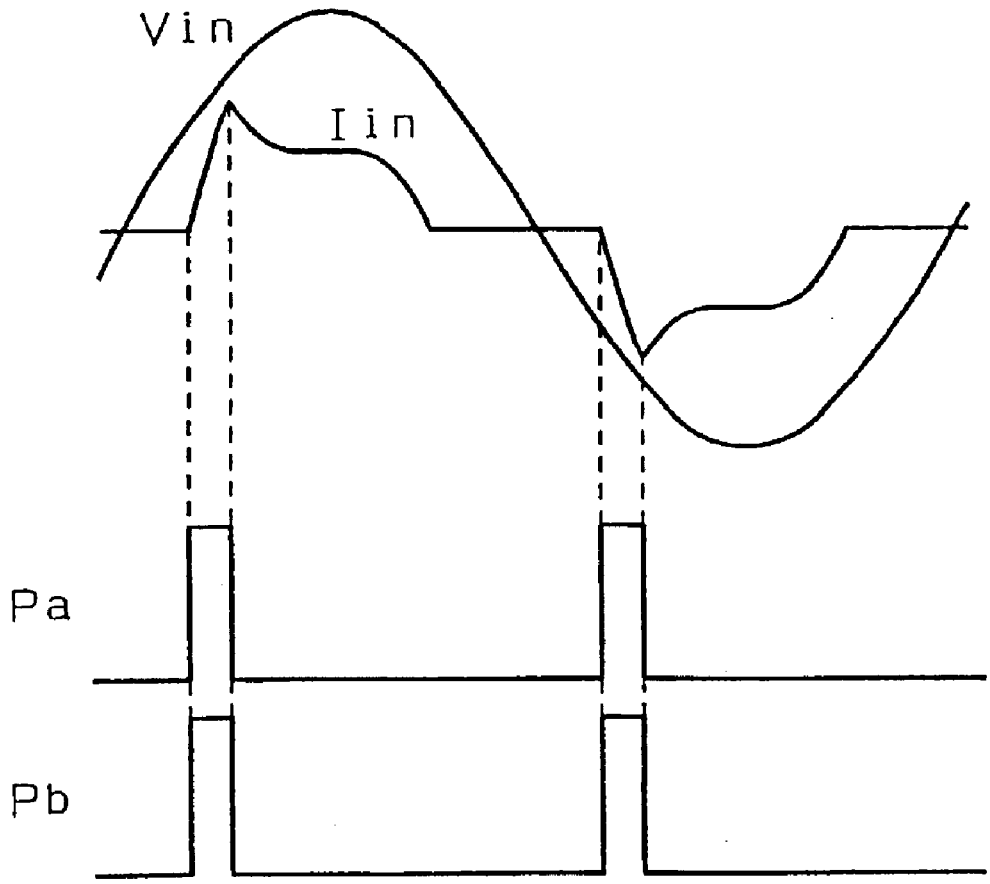
FIG. 2 is a view showing a pulse signal and its principal waveform in the power supply device according to the first embodiment of the present invention.

FIG. 1 is a view showing a pulse signal outputted by the pulse signal controller 22, a power supply voltage, and a waveform of an input current in this embodiment. In FIG. 2, "Vin" shows a voltage of the AC power supply 1, "Iin" shows an input current, "Pa" shows a pulse signal for driving the switching element 4a, and "Pb" shows a pulse signal for driving the switching element 46.

Figure 31A:
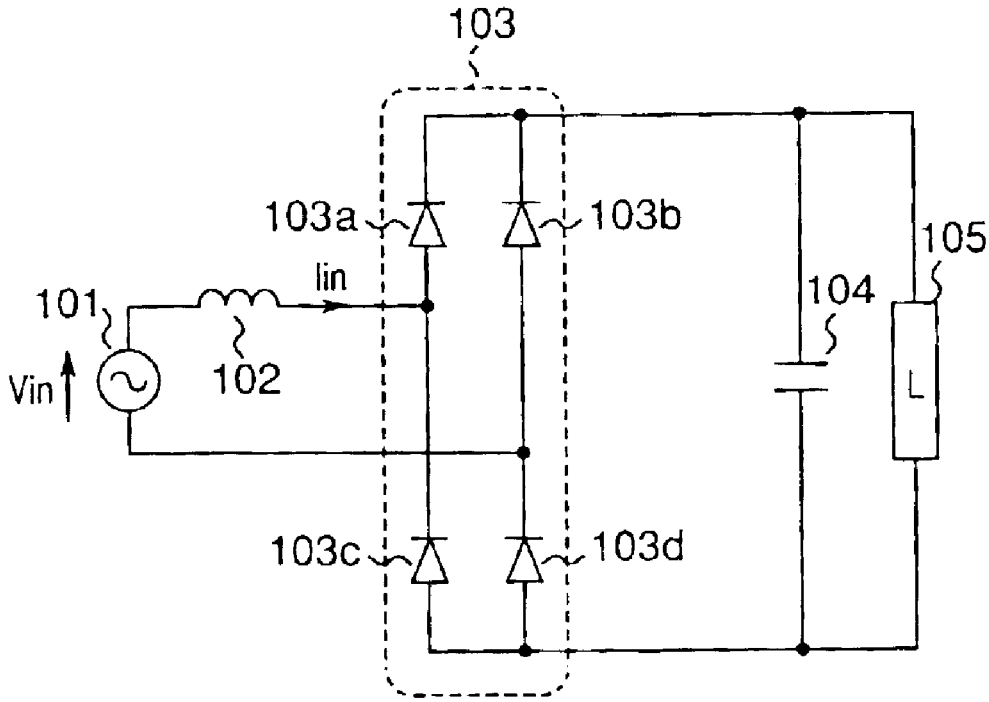
FIG. 31A is a circuit diagram showing one example of a conventional power supply device.
Figure 31B:
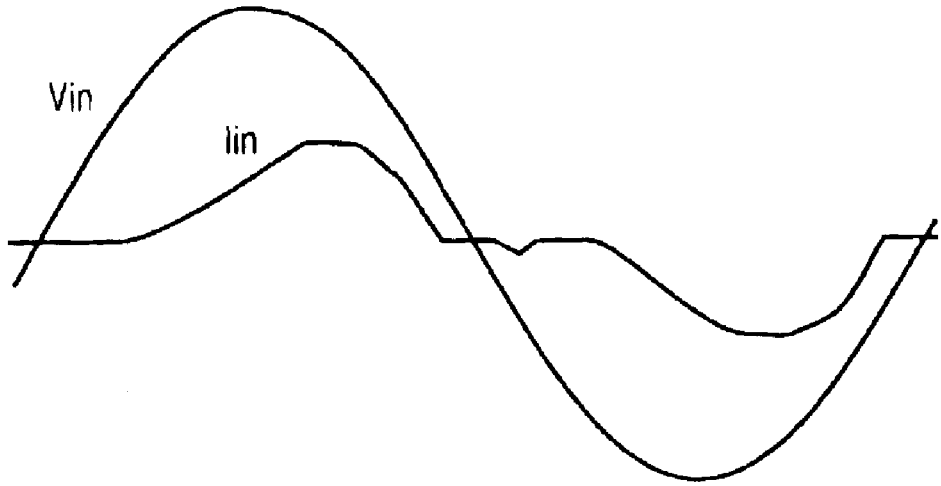
FIG. 31B is a view showing a principal waveform.
Figure 32A:
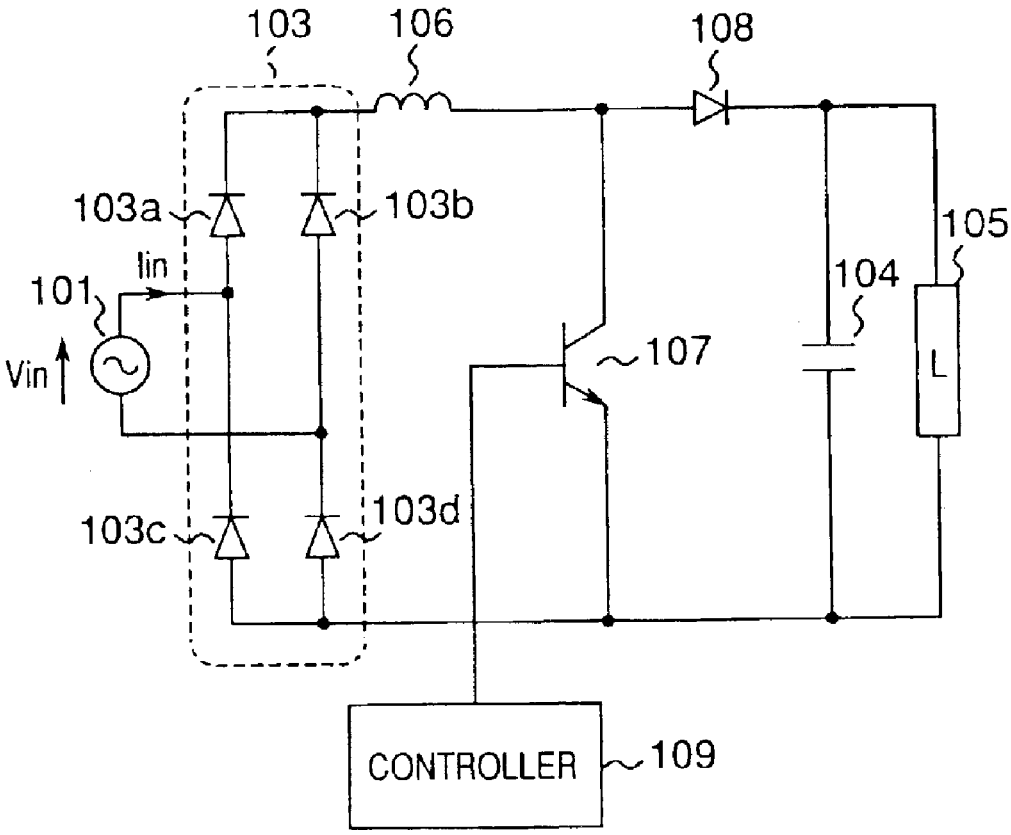
FIG. 32A is a circuit diagram showing another example of a conventional power supply device.
Figure 32B:
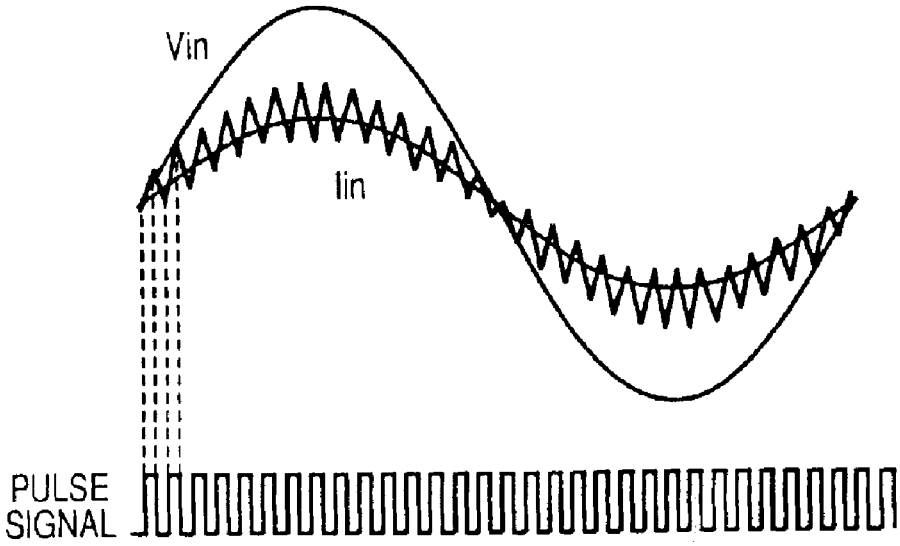
FIG. 32B is a view showing a principal waveform.

In FIG. 2, pulse signals Pa and Pb having the same pulse width are outputted to two switching elements 4a and 4b at the same timing. As a result, in a period of no current flow primitively, a short-circuit current flows via the rectifier circuit 2, the reactor 3 and the switching elements 4a and 4b, and thereby, it is possible to make wide a conduction period as compared with the conventional power supply device as shown in FIG. 31. Thus, it a possible to obtain a sufficiently high power factor, and to restrict a harmonic distortion contained in the input current As described above, in the power supply device of this first embodiment, a more sufficiently high power factor can be obtained with a simple construction and control. Therefore, it is possible to provide a low-loss power supply device which has a small switching noise, and prevents an increase of loss in a filter circuit and switching elements 4a and 4b.

Second Embodiment

Figure 3:
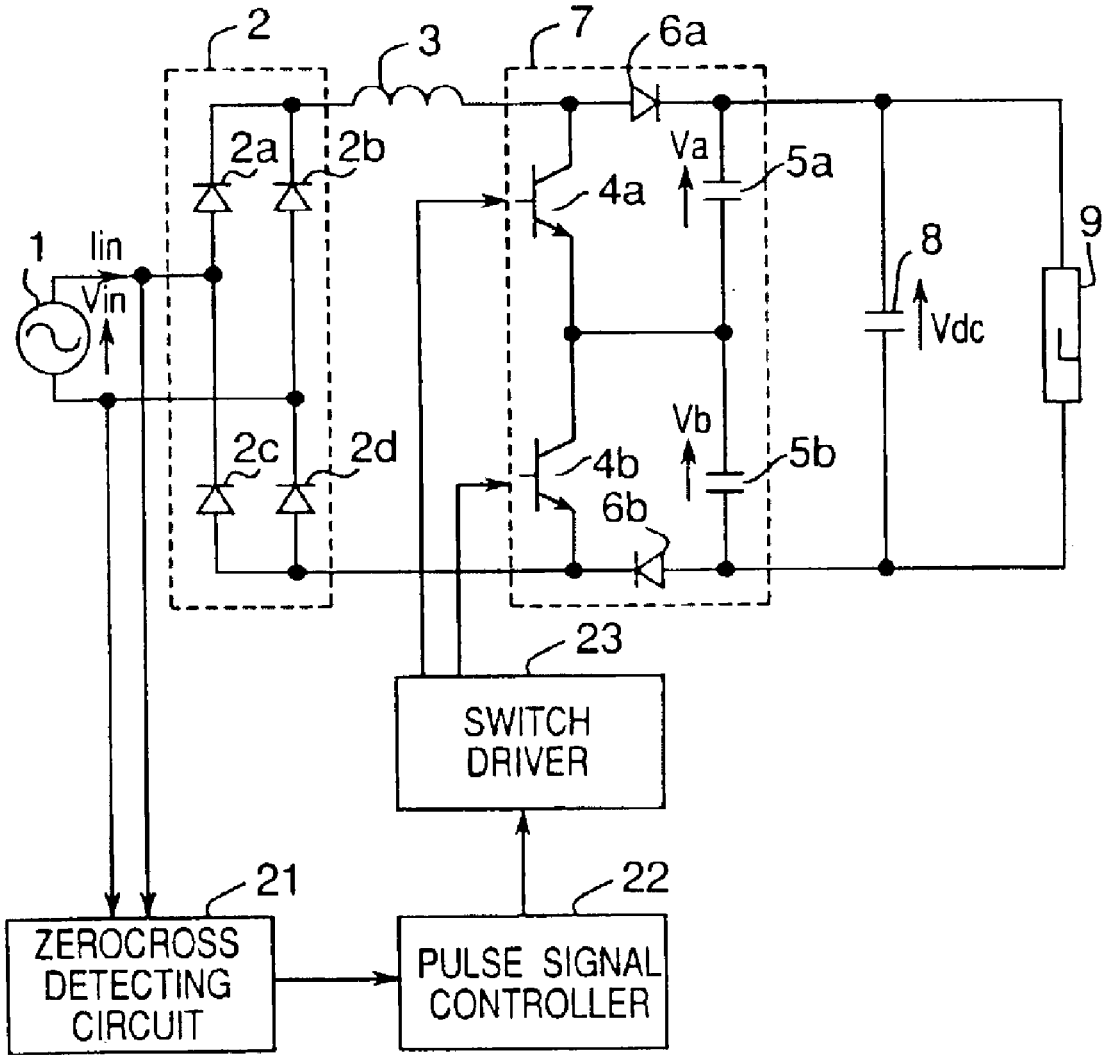
FIG. 3 is a circuit diagram showing a construction of a power supply device according to a second embodiment of the present invention.
Figure 4:
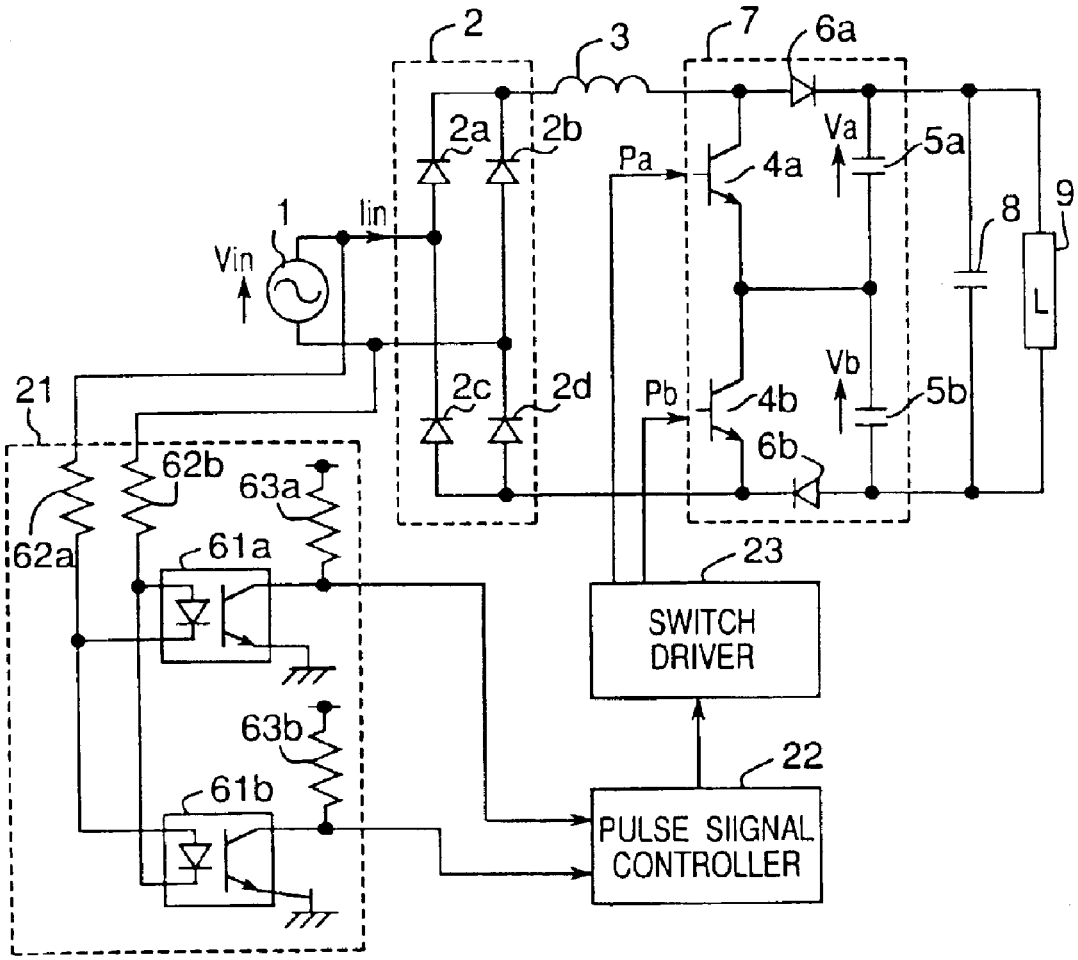
FIG. 4 is a circuit diagram showing a construction of a power supply device of the present invention, and in particular, is a circuit diagram showing a construction of a zero cross detecting circuit.

FIG. 3 is a circuit diagram showing a construction of a power supply device according to another embodiment of the present invention. As shown in FIG. 3, the power supply device further includes a zero cross detecting circuit 21 which detects a zero cross point of the AC power supply 1, and outputs a zero crass detection signal, in addition to the circuit construction shown in FIG. 1. FIG. 4 shows a construction of the power supply device including the zero cross detecting circuit 21 shown in detail. The zero cross detecting circuit 21 alternately detects a zero cross point of the AC power supply 1 for each half period with the use of resistors 62a, 62b, 63a and 63b and Photo-couplers 61a and 61b. The pulse signal controller 22 receives a zero cross detection signal from the zero cross detecting circuit 21, and then, generates and outputs a pulse signal for driving the switching elements 4a and 4b. This pulse signal controller 22 a composed of a general logic circuit or a microprocessor. The switch driver 23 receives a pulse signal from the pulse signal controller 22 so as to drive the switching elements 4a and 4b.

An operation of the pulse signal controller 22 will be described below. The pulse signal controller 22 generates and outputs two kinds of pulse signals for turning on two switching elements 4a and 4b respectively in a half-period of AC power supply 1. In this case, the two kinds of pulse signals are alternately switched over for each half period of the AC power supply 1 , and then, are outputted to two switching elements 4a and 4b, and thereby it is possible to uniformly supply a charging current to two capacitors 5a and 5b alternately for each half period, and thus, to widen a conduction period thereby improving a power factor.

Figure 5:
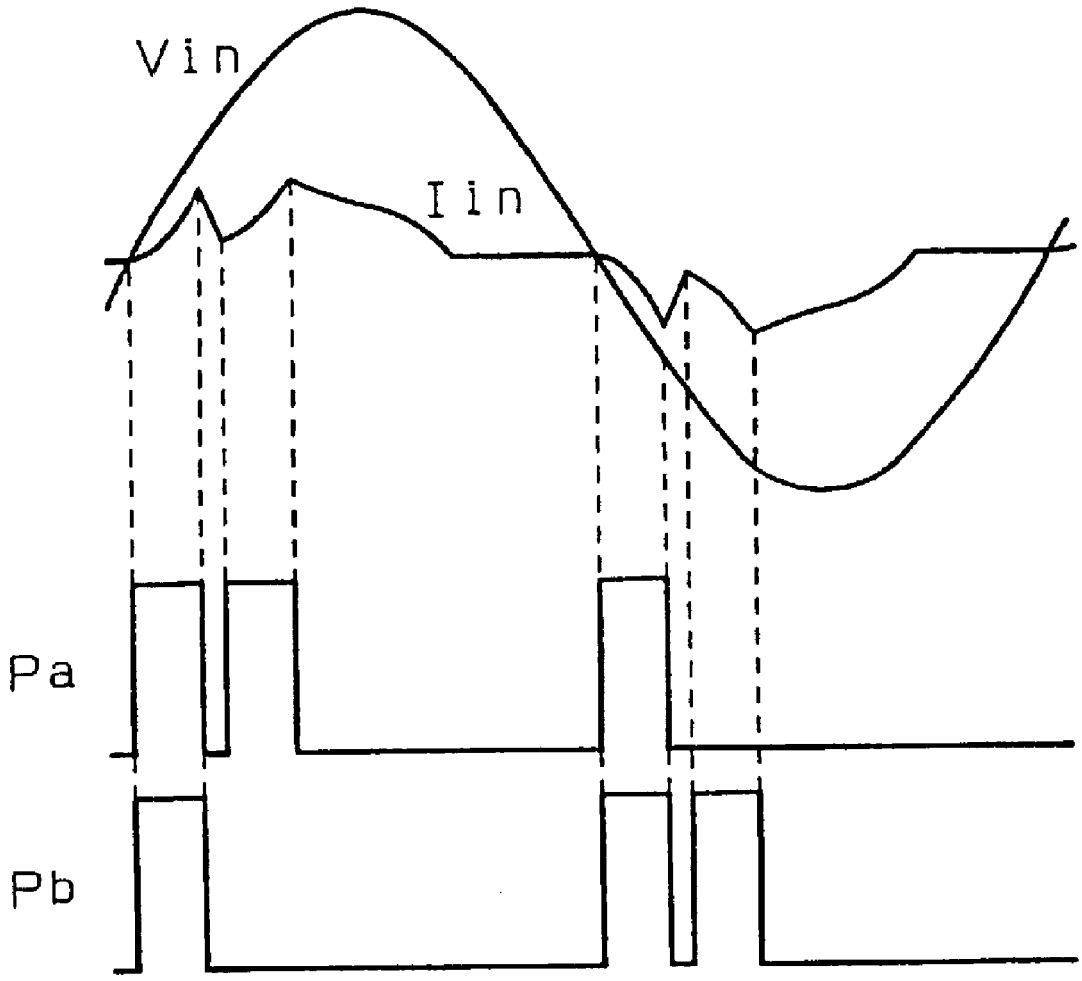
FIG. 5 is a view showing a pulse signal and its principal waveform in the power supply device according to the second embodiment of the present invention.

FIG. 5 is a view showing a pulse signal outputted by the pulse signal controller 22, a power supply voltage and a principal waveform of an input current in this second embodiment. As shown in FIG. 5, the pulse signal controller 22 outputs two pulse signals to the switching elements 4a and outputs one pulse signal to the switching element 4b in a positive half period of the power supply voltage Vin in synchronous with the zero cross point of the AC power supply 1. On the contrary, to a negative half period of the power supply voltage Vin, the number of pulse signals is switched over, more specifically, the pulse signal controller 22 outputs one pulse signal to the switching element 4a and outputs two pulse signals to the switching element 4b. In the aforesaid manner, a switch-over of an output pattern of the pulse signal it carried out for each half period of the AC power supply 1.

In FIG. 5, in the positive hall period of the AC power supply 1 , both switching elements 4a and 4b become on at the same time by means of the pulse signals Pa and Pb for a predetermined time in synchronous with the zero cross point of the AC power supply 1. A current short-circuiting the AC power supply 1 flows via the rectifier circuit 2, the reactor 3 and the switching elements 4a and 4b. Therefore, an input current rises up in synchronous with the zero cross point of the AC power supply 1.

Then, when the pulse signals Pa and Pb becomes off, a current decreases thereafter, the switching element 4a again becomes on by means of the pulse signal Pa. Thus, a current charging the capacitor 5b flows via the rector 3 and the switching element 4a; therefore, a current again increases. As a result, it is possible to enlarge a conduction period of the input current Likewise, to the negative half period of the AC power supply 1, a short-circuit current flowing via the reactor 3 and a charging current to the capacitor 5a flow, and thereby, it is possible to enlarge a conduction period of the input current.

The above operation is repeated for each period of the AC power supply 1, and thereby, it is possible to obtain a sufficiently high power factor, and to restrict a harmonic distortion.

As described above, air the power supply device of this second embodiment, the pulse signals Pa and Pb outputted to two switching elements 4a and 4b are switched over for each half period of the AC power supply 1. Whereby it is possible to obtain a sufficiently high power factor by a simple construction and control, and thus, to restrict a harmonic distortion. Further, it is possible to use a short-circuit current via the reactor 3, which has a relatively sudden current increases, and a charging current to the capacitor 5a or 5b, which has a relatively gentle current increase. Therefore, by use of these currents, and by change of circuit constant in combination with the use of these currents, it is possible to obtain various current waveforms to achieve a higher power factor.

Furthermore, a low-loss power supply device which can generate small noise and restrict an increase of loss in a filter circuit and the switching elements 4a and 4b can be provided.

This second embodiment has described an output pattern such that two or one pulse signal is alternately outputted to two switching elements 4a and 4b for each half period. The output pattern is not limited to this pattern.

Third Embodiment

Figure 6:
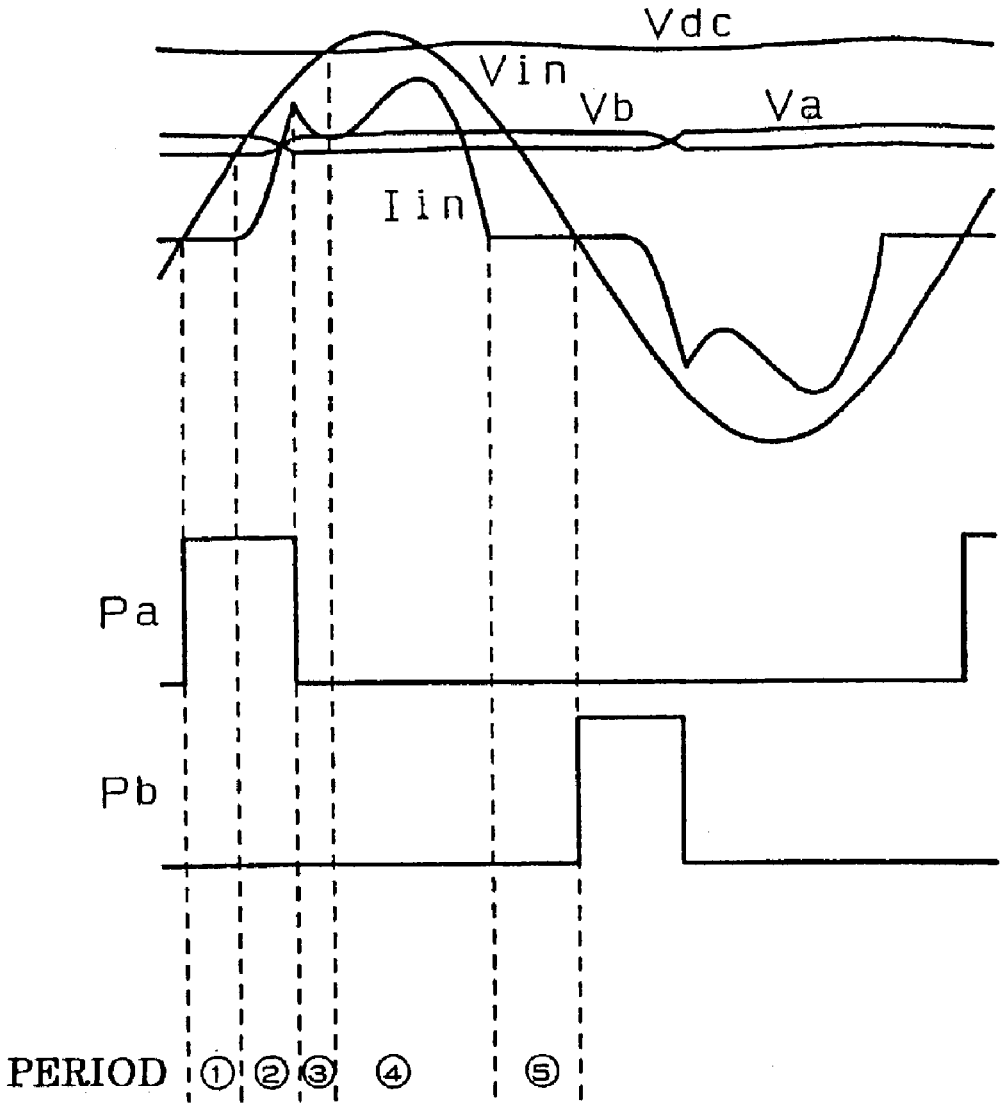
FIG. 6 is a view showing a pulse signal and its principal waveform in the power supply device according to the third embodiment of the present invention.

FIG. 6 is a view showing each waveform (hereinafter, referred to as "principal waveform) of a power supply voltage, an input current, and both ends voltage of each capacitor, and a waveform of a pulse in a power supply device according to still another embodiment of the present invention. FIG. 7 is a view showing a change of a current flowing path in the power supply device. A positive half period of a power supply voltage a divided into five periods, and then, an operation of each period will be described below in detail with reference to FIGS. 3, 6 and 7. In the following description, "Va" or "Vb" shows a voltage across capacitors 5a or 5b respectively, and "Vdc" shows a voltage across the smoothing capacitor 8.

Period ①: The pulse signal controller 22 outputs a pulse signal for taming on either of the switching elements 4a and 4b for a predetermined time in synchronous with the zero cross point of the voltage Vin of the AC power supply 1. In the example shown in FIG. 6, a pulse signal Pa for turning on the switching element 4a is outputted. At this time, a voltage on the load side seen from the AC power supply 1 becomes equal to voltage Vb of the capacitor 5b, and becomes a value of approximately ½ of the voltage Vdc of the smoothing capacitor 8. However, in this period, the power supply voltage Vin is lower than the voltage Vb of the capacitor 5b, and there is no current conduction from the AC power supply 1 to the load 9. Thus, no input current Iin flows.

Figure 7A:
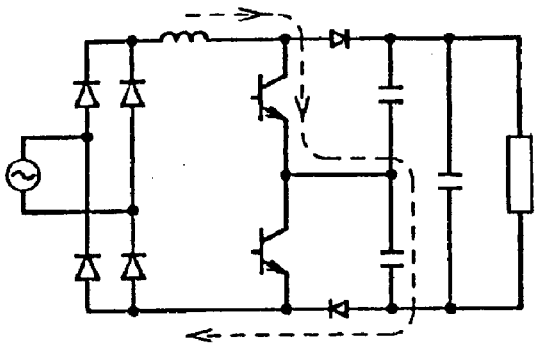
FIGS. 7A to 7D are views showing a current flowing path in one example of the power supply device of the present invention.
Figure 7B:
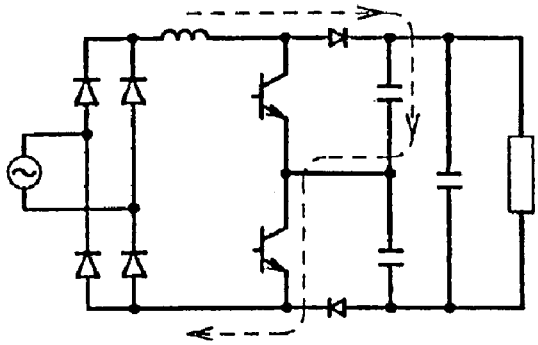

Period ②: The power supply voltage Vin becomes larger than the voltage Vb of the capacitor 5b; therefore, a charging current to the capacitor 5b starts to flow along a current flowing path as shown in FIG. 7A, and then, the current increases until the on state of the pulse signal is completed while the voltage Vb of the capacitor 5b increasing as increase of the current.

Period ③: Two switching, elements 4a and 4b are both in an off state, and a voltage on the load side from the AC power supply 1 becomes equal to the voltage Vdc of the smoothing capacitor 8. At this time, the power supply voltage Vin is smaller than the Vdc; however, the input current Iin continues to flow by an energy stored in the reactor 3 while decreasing.

Figure 7C:
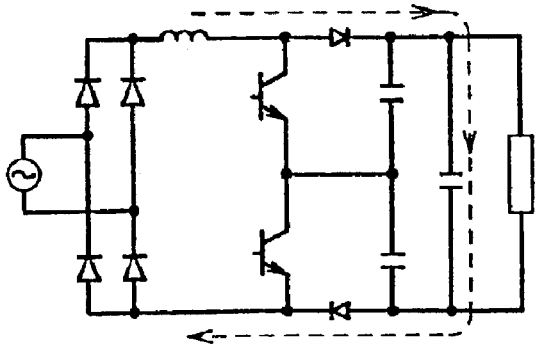

Period ④: The power supply voltage Vin becomes larger than the voltage Vdc of the smoothing capacitor 8, and in this interval, the input current Iin flows along a current flowing path as shown in FIG. 7C to charge the smoothing capacitor 8.

Period ⑤: The charge to the smoothing capacitor 8 is completed, and in this period, no input current Iin flows.

The operation from the Period ① to Period ⑤ described above can make early a rise of the input current as compared with the conventional case, and widen a conduction period of the input current.

Moreover, in the negative half period of the AC power supply 1, the pulse signal controller 22 outputs a pulse signal for running on the switching element 4b for a predetermined time. At thus time, a voltage to the load side seen from the AC power supply 1 becomes equal to the voltage Va of the capacitor 5a. As well as the positive half period of the AC power supply 1 already described, a charging current to the capacitor 5a starts to flow from the point where the power supply voltage Vin becomes larger than the Va along a current flowing path as shown to FIG. 7B. After that, the same operation as the positive half period of the AC power supply 1 is carried out. Thus, it is possible to make early a rise of the input current as compared with the conventional case to widen a conduction period of the input current.

Repeating the operation as described above for each period of the AC power supply 1 can provide a sufficiently high power factor, and reduce a harmonic distortion contained in the input current.

As described above, the power supply device of this third embodiment can realize a reduction of a harmonic distortion contained in the input current by a simple construction and by a very simple control of one-time pulse signal output to the half period of the power supply voltage. This allows a low-loss power supply device to have a small switching noise, and restrict an increase of loss in a filter circuit and the switching elements 4a and 4b.

The power supply device of thus embodiment is effective specially in case where the power supply device of this embodiment is applied to equipment such as an air conditioner or the like, and in case where the AC power supply 1 is 200V, when the switching element 4a or 4b is in an on state, a voltage applied to the reactor 3 is moderated only by the voltages Va and Vb of the capacitors 5a and 5b. Therefore, it is possible to greatly matte the reactor 3 into a small size as compared with the conventional power supply device shown in FIG. 33. Thus, the system can be miniaturized as a whole and reduce a loss in the reactor 3 to achieve a low loss of equipment.

Fourth Embodiment

Figure 7D:
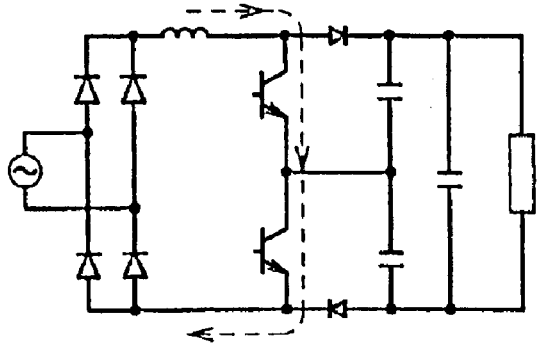
Figure 8:
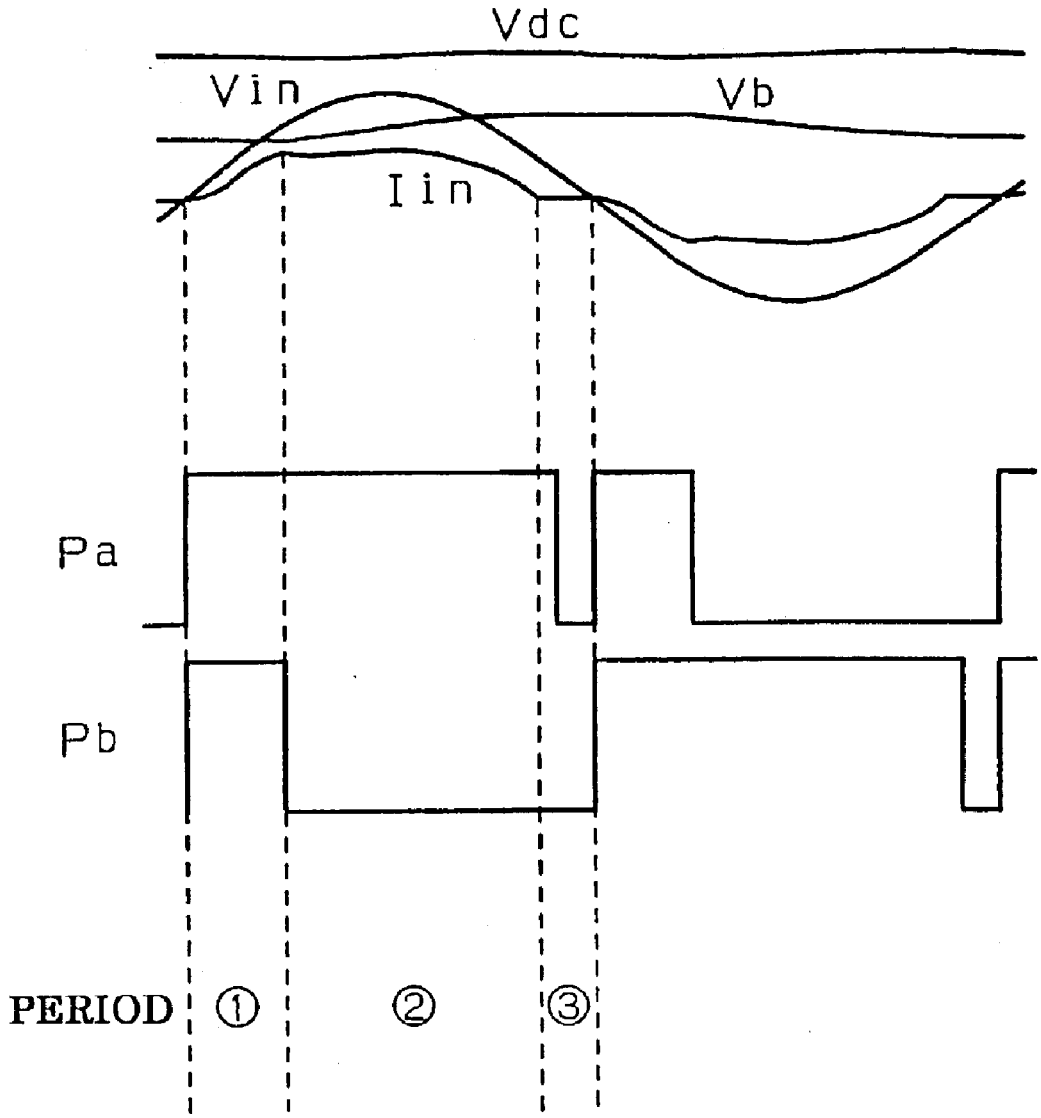
FIG. 8 is a view showing a pulse signal and its principal waveform in the power supply device according to the fourth embodiment of the present invention.

FIG. 8 is a view showing a pulse signal and a waveform of a principal waveform in a power supply device according to still another embodiment of the present invention. A positive half period of a power supply voltage is divided into three periods, and then, an operation of each period will be described below in detail with reference to FIG. 3. FIG. 7 and FIG. 8.

Period ①: The pulse signal controller 22 outputs a pulse signal having different pulse width for turning on two switching elements 4a and 4b for a predetermined time in synchronous with the zero cross point of the voltage Vin of the AC power supply 1. In the example shown in FIG. 8, the pulse signal controller 22 outputs a pulse signal Pb for turning on the switching element 4b for a relatively short tune in synchronous with a detection of the zero cross point of the AC power supply 1, and outputs a pulse signal Pa for turning on the switching element 4a for a time which is longer than that of the switching element 4b and is equal to or shorter than a half period of the AC power supply 1. As a result, in the Period ①, both two switching elements 4a and 4b become an on state, and a current short-circuiting the AC power supply 1 flows along a current flowing path as shown in FIG. 7D via the rectifier circuit 2, the reactor 3 and the switching elements 4a and 4b.

Period ②: The switching element 4b becomes an off state. A voltage on the load side seen from the AC power supply 1 becomes equal to the voltage Vb of the capacitor 5b. At this time, the power supply voltage Vin is larger than the Vb, charging current flows to the capacitor 5b via the reactor 3 along the current flowing path shown in FIG. 7A.

Period ③: The charge to the capacitor 5b is completed, and in this period, no input current Iin flows.

Like the third embodiment, the operation form the Period ① to the Period ③, as described above, can make early a rise of the input current as compared with the conventional power supply device to widen a conduction period of the input current.

Moreover, in the negative half period of the AC power supply 1, the pulse signal controller 22 detects the zero cross point, and thereafter, conversely to the case of the positive half period of the AC power supply 1, outputs a pulse signal Pa for turning on the switching element 4a for a relatively short time, and a pulse signal Pb for turning on the switching element 4b for a time which is longer than that of the switching element 4a and is equal to or shorter than a half period of the AC power supply 1. As a result in the negative half period of the AC power supply 1, the same operation as the positive half period is performed to make early a rise of the input current as compared with the conventional power supply device and to obtain a current waveform having a wide conduction period.

Repeating the operation as described above for each period of the AC power supply 1 can obtain a sufficiently high power factor and reduce a harmonic distortion contained in the input current.

In the power supply device of this fourth embodiment, in the Period ①, an energy is stored in the reactor 3 by a short-circuit current via the reactor 3 along the current flowing path shown in FIG. 7D. In the Period ②, energy is stored in the capacitors 5a and 5b by the changing current to the capacitor 5b or 5a along the current flowing path shown in FIG. 7A or 7B. Therefore, the power supply device of this embodiment can provide high power factor and the output voltage Vdc sufficiently larger than the voltage Vin of the AC power supply 1. Thus, an output voltage higher than a voltage obtained by voltage doubler rectification can be provided.

As described above, the power supply device of this embodiment can enlarge a conduction period by a very simple control of one-time pulse signal output by output of a pulse signal having different pulse in the half period of the power supply voltage to two switching elements 4a and 4b respectively. Thus, a sufficiently high power factor can be achieved.

Further, a switching noise is small, and it is possible to restrict an increase of loss in a filter circuit and the switching elements 4a and 4b. Therefore, a reduction of loss can be achieved. In addition, since an output voltage is increased greater than a voltage obtained by voltage doubler rectification, it is possible to provide a power supply device which is adaptable to a load requiring a high DC voltage.

Figure 9:
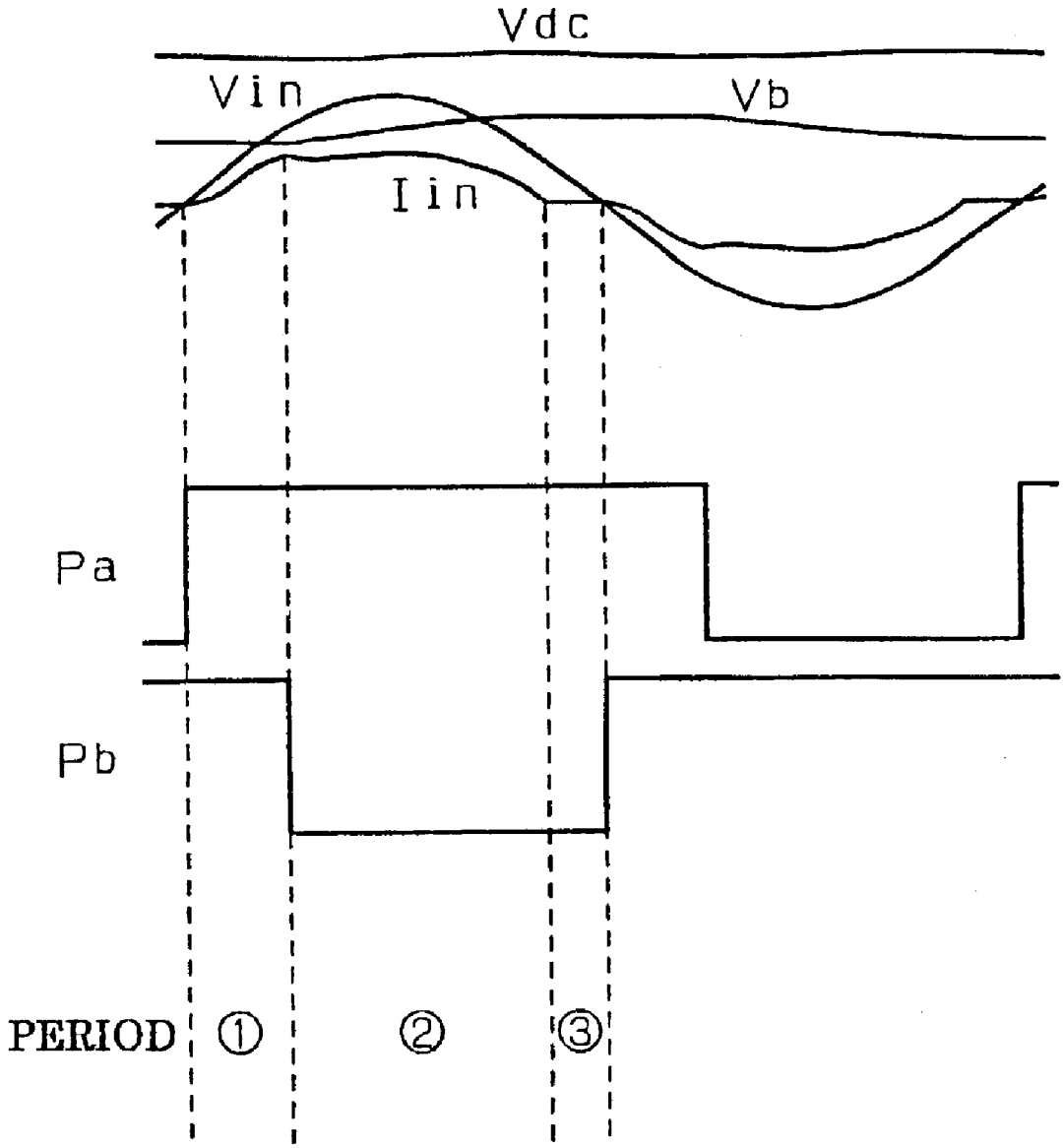
FIG. 9 is a view showing another pulse signal and its principal waveform in the power supply device according to the fourth embodiment of the present invention.

In the power supply device according to the invention shown in the third embodiment, as shown in FIG. 9, by generating a pulse signal for turning on the switching element for a period longer than the half period of the AC power supply 1, and outputting the generated pulse signal alternately for each half period of the AC power supply 1, it is possible to carry out the same operation as, the power supply device of the fourth embodiment to obtain the same effect.

In the power supply device of this fourth embodiment, a pulse width of two pulse signals Pa and Pb having different pulse width is controlled within a range less than the half period of the power supply voltage. Therefore, it is possible to control an output voltage value of the power supply device in a wide range while obtaining high power factor correction effect.

Fifth Embodiment

Figure 10:
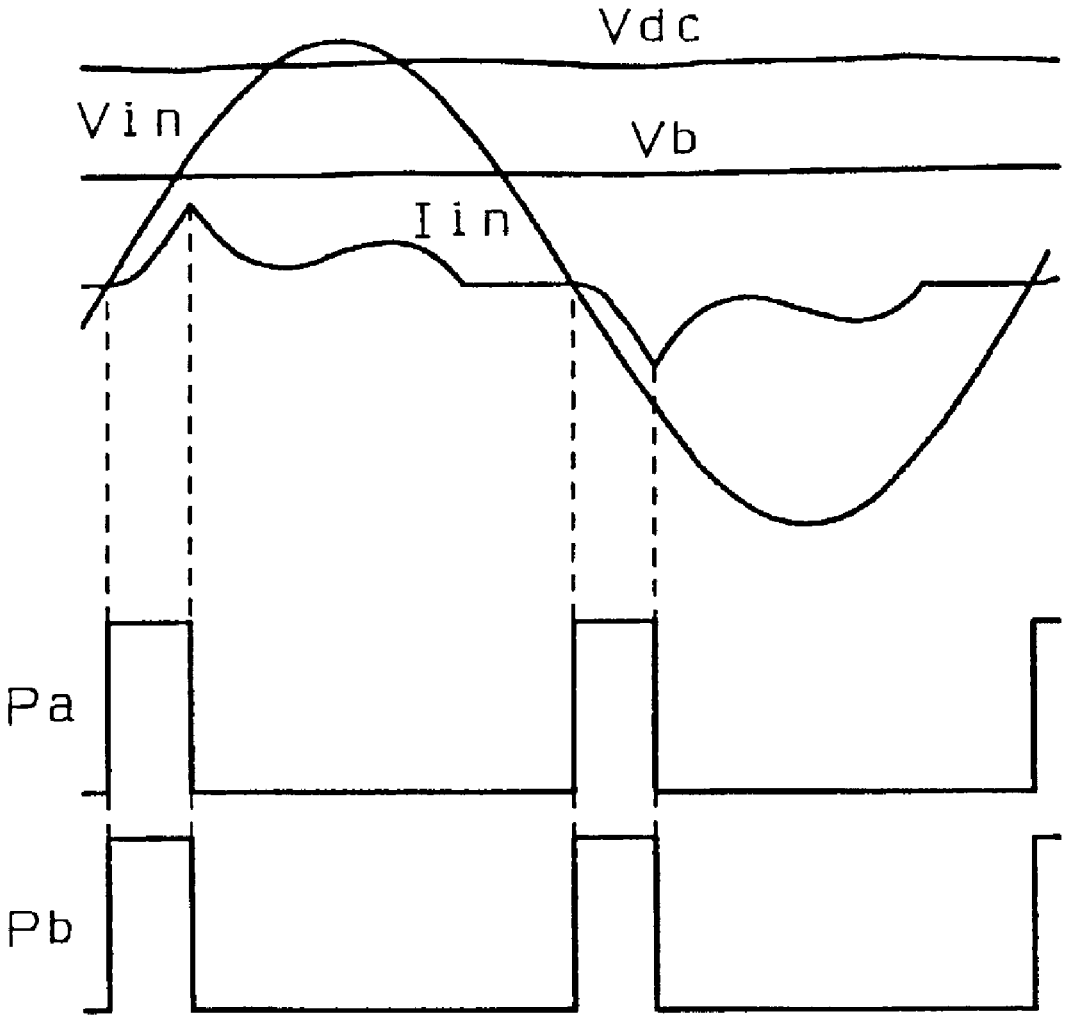
FIG. 10 is a view showing a pulse signal and its principal waveform in the power supply device according to the fifth embodiment of the present invention.

FIG. 10 is a view showing a pulse signal and a waveform of a principal waveform in a power supply device according to still another embodiment of the present invention. The fifth embodiment will be described below in detail with reference to FIGS. 3, 7 and 10.

In the example shown in FIG. 10, pulse signals Pa and Pb having the same pulse width are simultaneously outputted to both two switching elements 4a and 4b in synchronous with a zero cross detection signal from the zero cross detecting circuit 21. As a result, when both switching elements 4a and 4b are in a on state, a short-circuit current flows via the rectifier circuit 2, the reactor 3 and the switching elements 4a and 4b along the current flowing path shown in FIG. 7D. Therefore, the input current Iin can flow in the vicinity of the zero cross point of the AC power supply 1 where there is primitively no current flow. Thus, the input current Iin can rise up in synchronous with the zero cross point, it is possible to greatly widen a conduction period so as to obtain a sufficiently high power factor, and to reduce a harmonic distortion contained in the input current Iin.

Thus, as seen from FIGS. 3, 7 and 10, in the power supply device of this fifth embodiment, the conduction period is enlarged by a simple control of simultaneously turning on two switching elements 4a and 4b in a half period of the power supply voltage. Therefore, a sufficiently high power factor can be obtained to greatly reduce a harmonic distortion contained in the input current.

Further, a switching noise becomes small, and it is possible to restrict an increase of loss in a filter circuit and the switching elements 4a and 4b so as to achieve a low loss. Therefore, an energy can be stored in the reactor 3 by a short-circuit current via the reactor 3 to increase an output voltage Vdc.

Figure 33A:
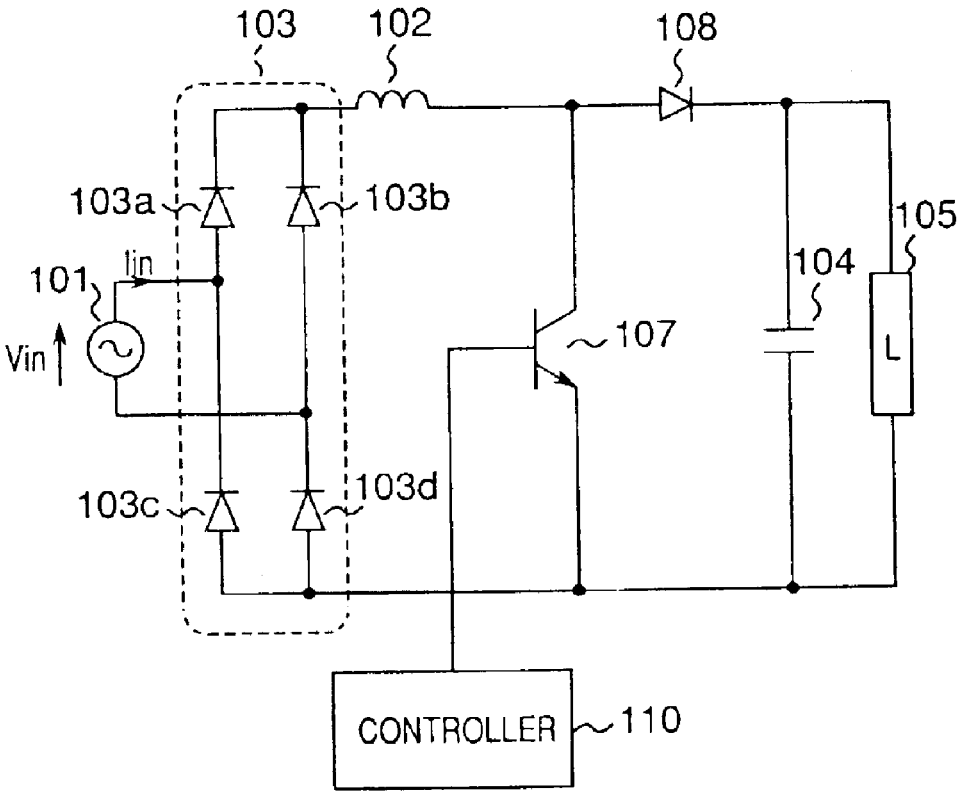
FIG. 33A is a circuit diagram showing still another example of a conventional power supply device.
Figure 33B:
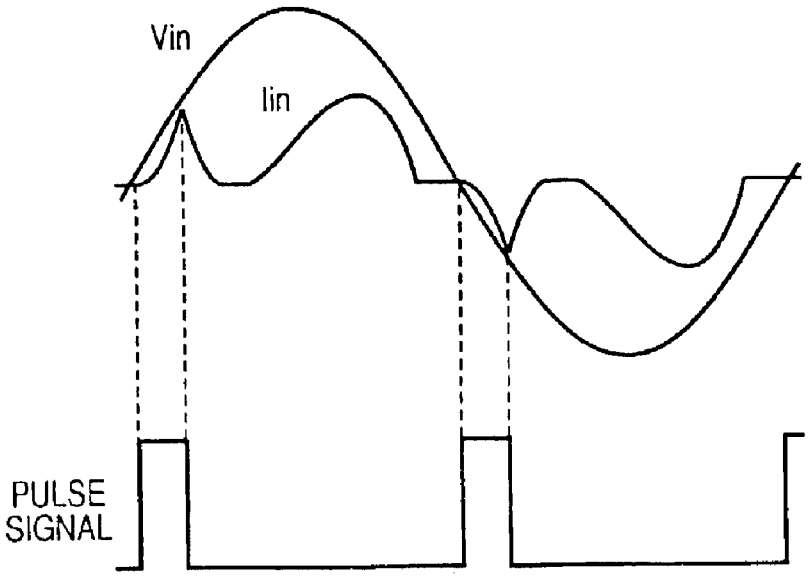
FIG. 33B is a view showing a principal waveform.
Figure 34A:
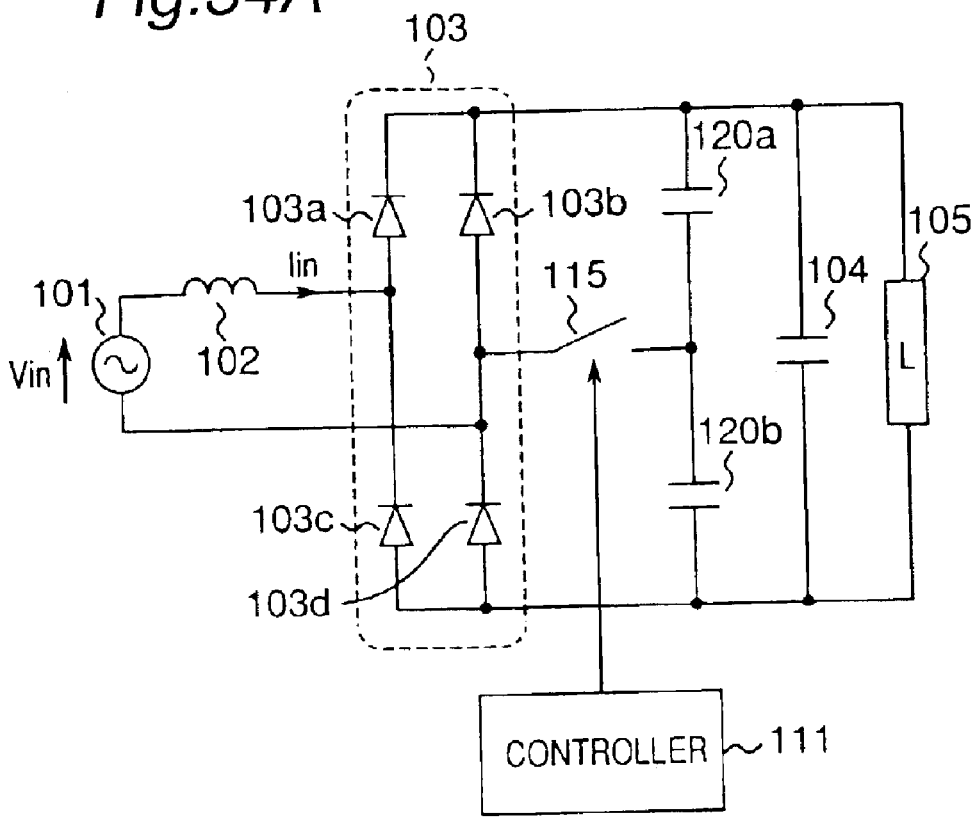
FIG. 34A is a circuit diagram showing still another example of a conventional power supply device.
Figure 34B:
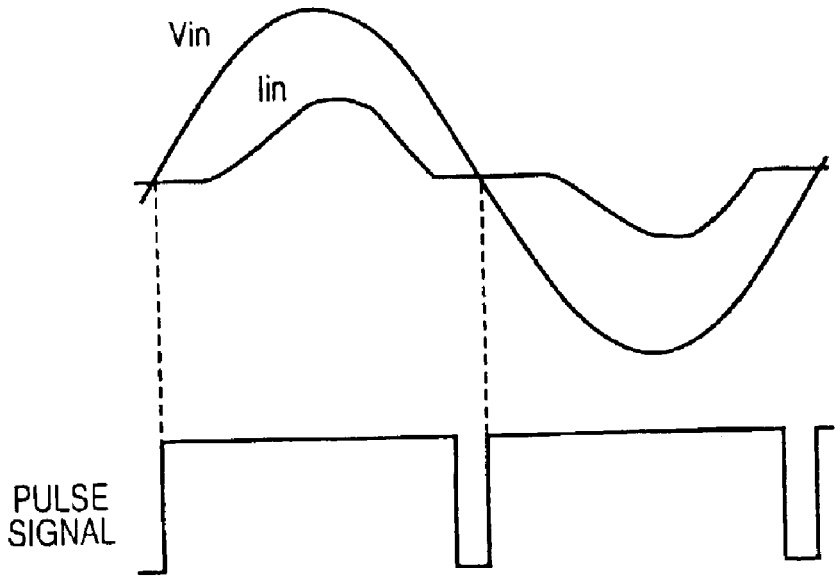
FIG. 34B is a view showing a principal waveform.

In a circuit construction of this embodiment, since the switching elements 4a and 4b are connected in series, a voltage applied to each of the switching elements 4a and 4b becomes half as compared with the conventional case shown in FIG. 33. Whereby it is possible to use the switching elements 4a and 4b having a low withstand voltage, so that individual components can be miniaturized. As a result, the power supply device can be made into a small size as a whole.

Moreover, a voltage applied to each of the switching elements 4a and 4b is a half of the conventional case shown in FIG. 33. Therefore, a switching loss in the switching elements 4a and 4b can be reduced in particular, when the input current is small, that is, in a low load, it is possible to realize a low-loss power supply device. The above effect is not limited to this fifth embodiment, and the same effect can be obtained in the power supply device of other embodiments.

Sixth Embodiment

Figure 11:
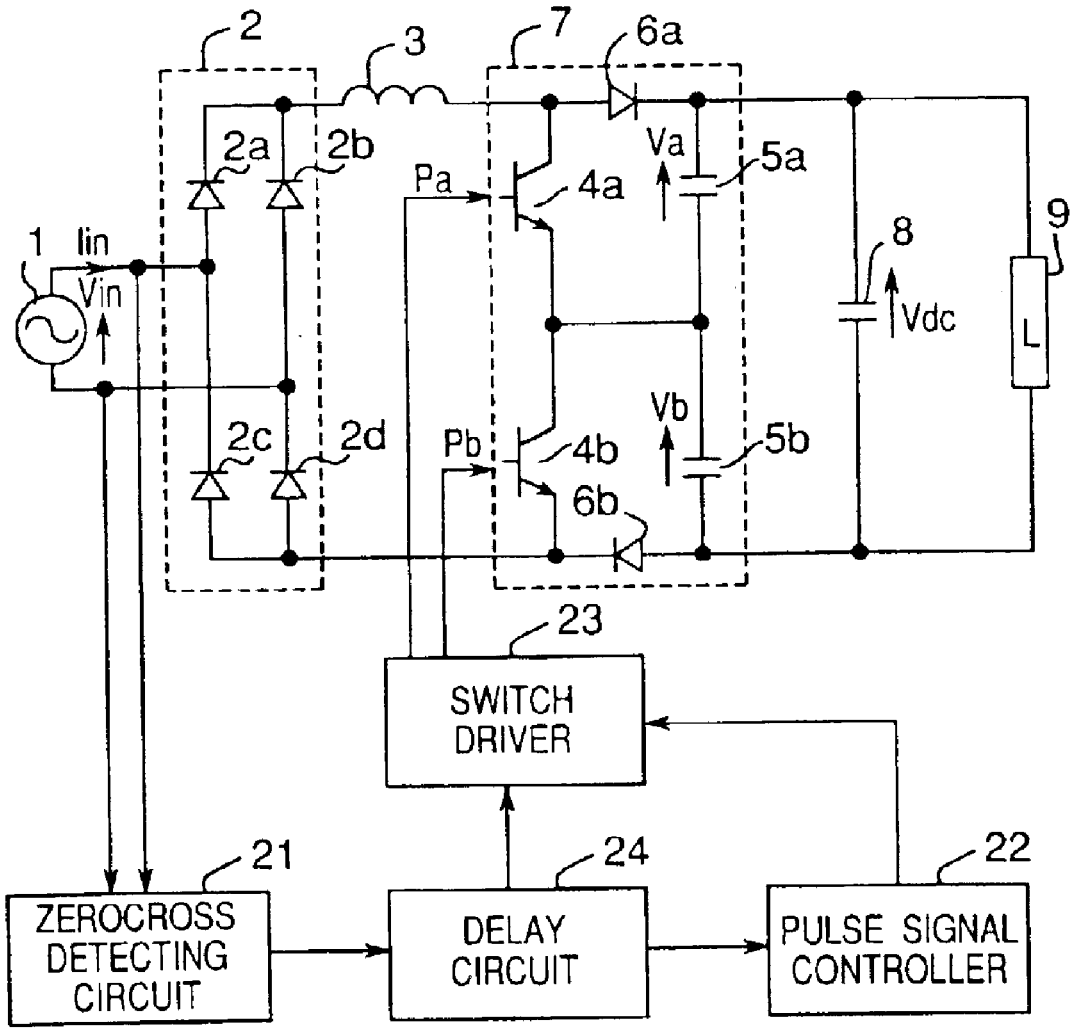
FIG. 11 is a circuit diagram showing a construction of a power supply device according to a sixth embodiment of the present invention.

FIG. 11 is a circuit diagram showing a construction of a power supply device according to sell another embodiment of the present invention. As shown in FIG. 11, the power supply device further includes a detection signal delay circuit 24 in addition to the circuit structure shown in FIG. 3, the detection signal delay circuit 24 receives a zero cross detection signal from the zero cross detecting circuit 21, delays the received signal by only predetermined time to generate a zero cross delay signal, and outputs the delay signal to the pulse signal controller 22. The detection signal delay section 24 comprises a delay circuit including a capacitance and a resistance and using a charging tune constant, an IC having a timer function, a microprocessor or the like.

The power supply device shown in FIG. 11 will be described below. The pulse signal control signal 12 receives a zero cross signal delayed for a predetermined time from the zero cross point obtained by the detection signal delay section 24, and then, outputs a pulse signal for turning on at least one of the switching elements 4a and 4b for a predetermined time.

Figure 12:
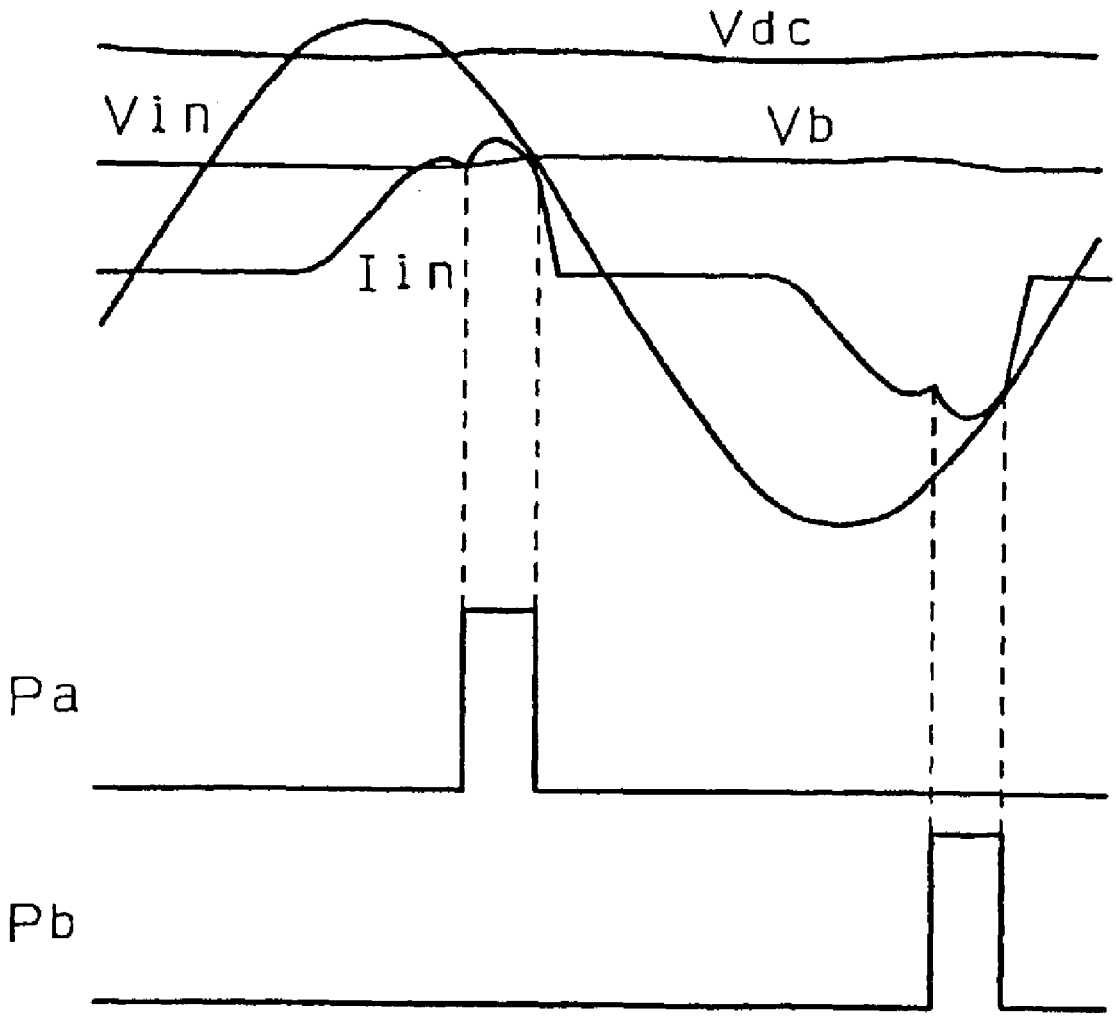
FIG. 12 is a view showing a pulse signal and its principal waveform in the power supply device according to the sixth embodiment of the present invention.

FIG. 12 is a view showing a pulse signal and a principal waveform in the power supply device of this sixth embodiment. As shown in the example shown in FIG. 12 in the positive half period of the AC power supply 1, the switching element 4a is turned on in a portion of a latter-half phase of the half period by the pulse signal Pa, and in due negative half period of the AC power supply 1, the switching element 4b is turned on in a portion of a latter-half phase of the half period by the pulse signal Pb.

As seen from an input current waveform Iin shown in FIG. 12, the pulse signal is delayed, and thereby, in the latter-half phase portion of the input current, the pulse signal is outputted at the same timing as in the former half phase for each half period of the power supply voltage. Therefore, a charging current flows to the capacitors 5a and 5b so as to widen a conduction period.

In the power supply device of this sixth embodiment, by delaying the pulse signal from the zero cross point of the AC power supply 1 for a predetermined time, the input current can flow in an arbitrary phase interval of the half period Therefore, the power supply device has the following advantages in particular. The pulse signal which is outputted in a period where no current primitively flows can greatly enlarge a conduction period to obtain high power factor. In addition, a noise is lowered, and a filter circuit is simplified, and further, a loss to the switching means is lowed. Therefore, it is possible to provide a low-loss power supply device which has a simple construction. Further, by combining the pulse signal control in the above embodiment can widen a conduction period. Thus, a power factor can be greatly improved and also a harmonic distortion can be restricted.

Seventh Embodiment

Figure 13:
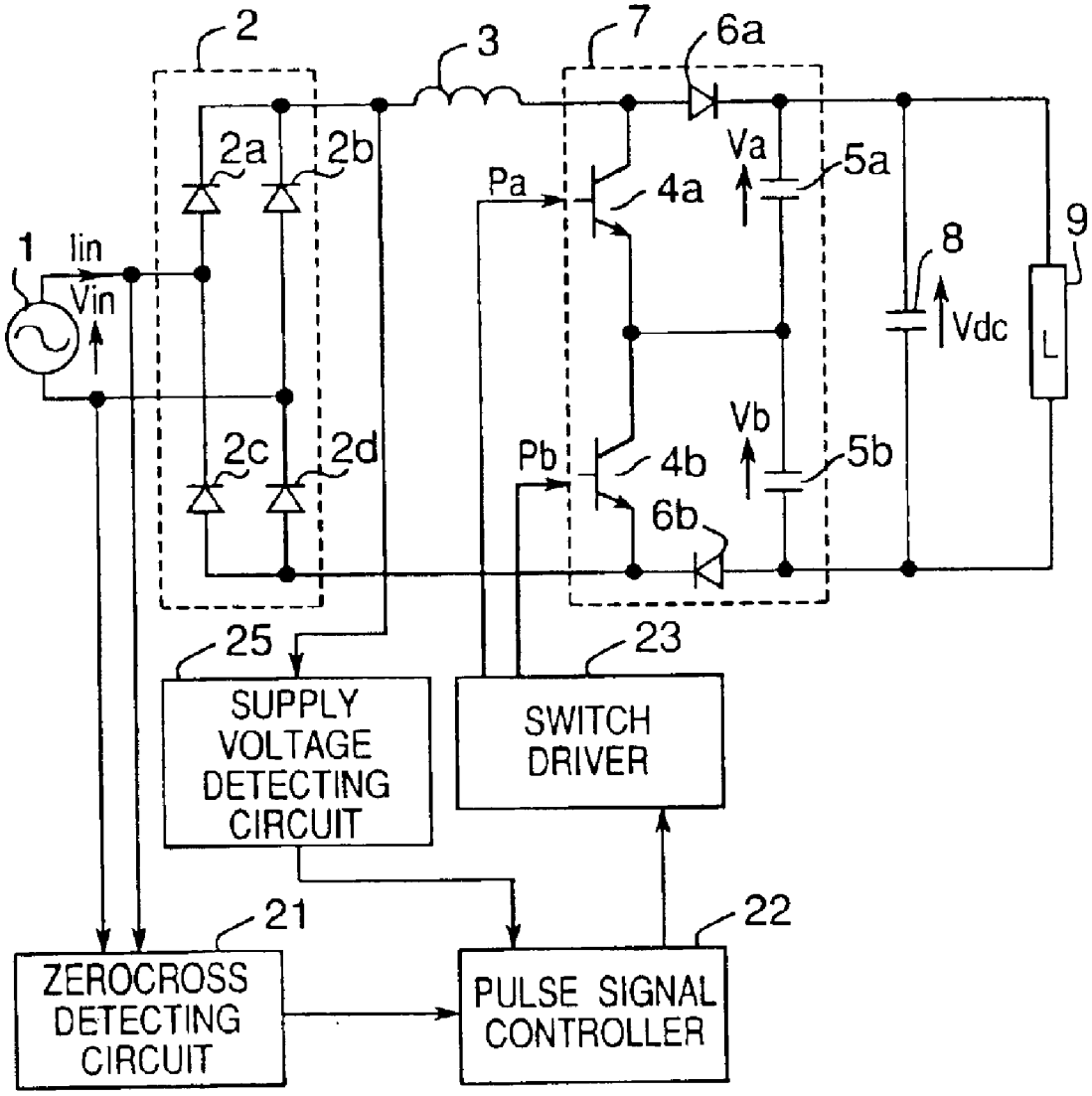
FIG. 13 is a circuit diagram showing a construction of a power supply device according to a seventh embodiment of the present invention.

FIG. 13 is a circuit diagram showing a construction of power supply device according to still another embodiment of the present invention. As shown in FIG. 13, the power supply device further includes a supply voltage detecting circuit 25 for detecting a voltage of the AC power supply 1, in addition to, the circuit construction shown in FIG. 3, The supply voltage detecting circuit 25 is composed using a resistor, a transformer on requiring insulation or the like, and detects an alternating voltage Vin or an output ripple voltage |Vin| of the rectifier circuit 2. The power supply device of this seventh embodiment will be described below with reference to FIG. 13.

The pulse signal controller 22 receives a value of the power supply voltage obtained from the supply voltage detecting circuit 25, and then, outputs a pulse signal for turning on at least one of the switching elements 4a and 4b for a predetermined time in synchronous with the time when the power supply voltage value reaches a predetermined value. As a result, the pulse signal is outputted at the same timing every time for each half period of the AC power supply 1, so that a conduction period can be accurately enlarged for each period of the AC power supply 1. Therefore, it is possible to obtain high power factor, and to accurately restrict a harmonic distortion. Whereby a power supply device having a high reliability can be obtained, In the power supply device of this seventh embodiment, in place of the zoo cross point detected by the zero cross detecting circuit 31, a control for outputting a pulse signed is carried out cm the basis of the voltage value of the power supply 1 obtained from the supply voltage detecting circuit 25 which reaches a predetermined value. Thereby it is possible to get the same advantage as the above second to sixth embodiments. Usually, in the case where the voltage value of the AC power supply 1 varies, and output voltage Vdc increases and decreases in accordance with an increase and decrease of the voltage value. In the power supply device of this embodiment, however, by comparing the voltage value of the AC power supply 1 with a predetermined value, an output timing of the pulse signal automatically changes when the power supply voltage varies.

More specifically, since the output timing of the pulse signal is advanced when the power supply voltage increases, the switching elements 4a and 4b become an on state when the power supply voltage is smaller than usual. As a result, an energy stored in the reactor 3 or the capacitors 5a and 5b decreases and the output voltage Vdc decreases. Conversely, since the output timing of the pulse signal is delayed when the power supply voltage decreases, the switching elements 4a and 4b become an on state when the power supply voltage is larger than usual. As a result, since an energy stored to the reactor 3 or the capacitors 5a and 5b increases, the output voltage Vdc increases. Therefore, in the power supply device of this seventh embodiment in the case where a variation of power supply voltage is small, an output voltage can be kept substantially constant, and the power supply device has an advantage of being durable to a disturbance.

Eighth Embodiment

Figure 14:
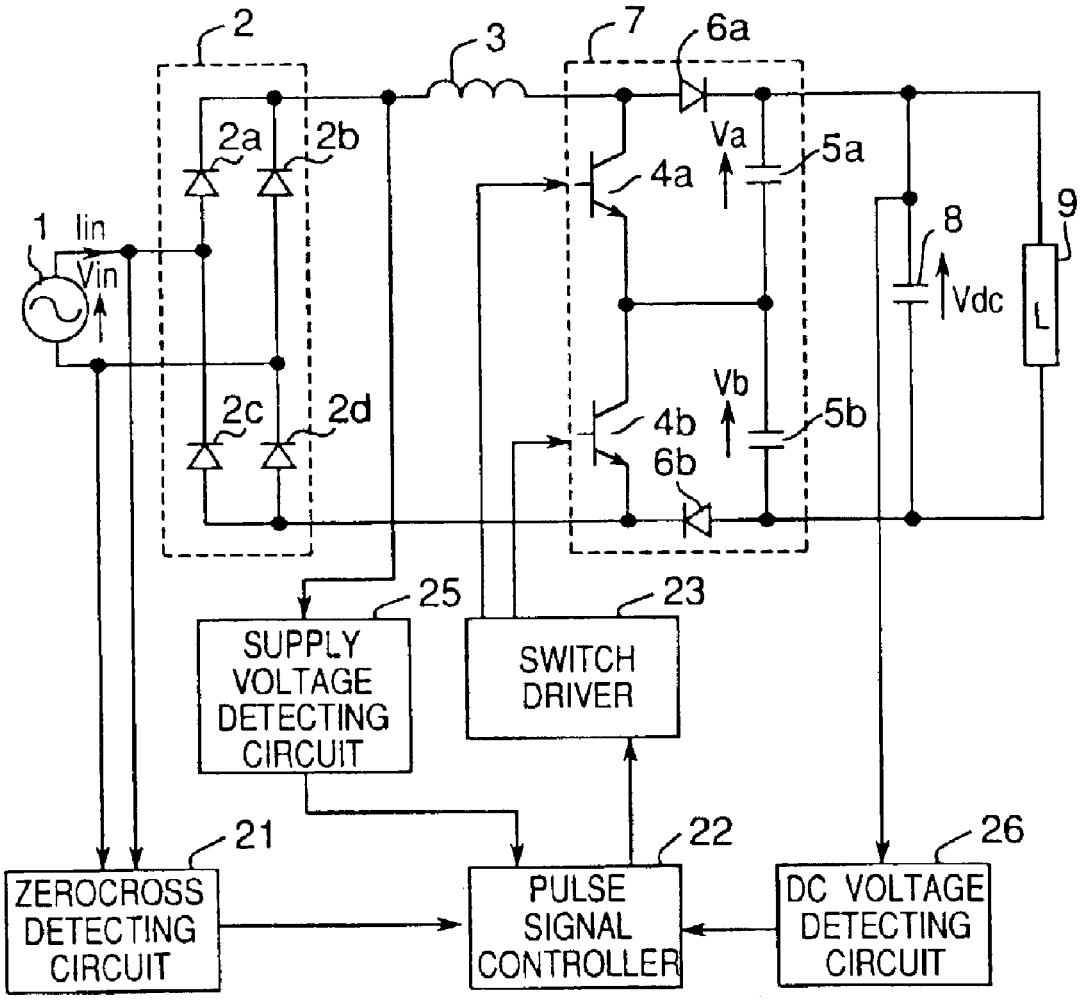
FIG. 14 is a circuit diagram showing a construction of a power supply device according to a eighth embodiment of the present invention.
Figure 15:
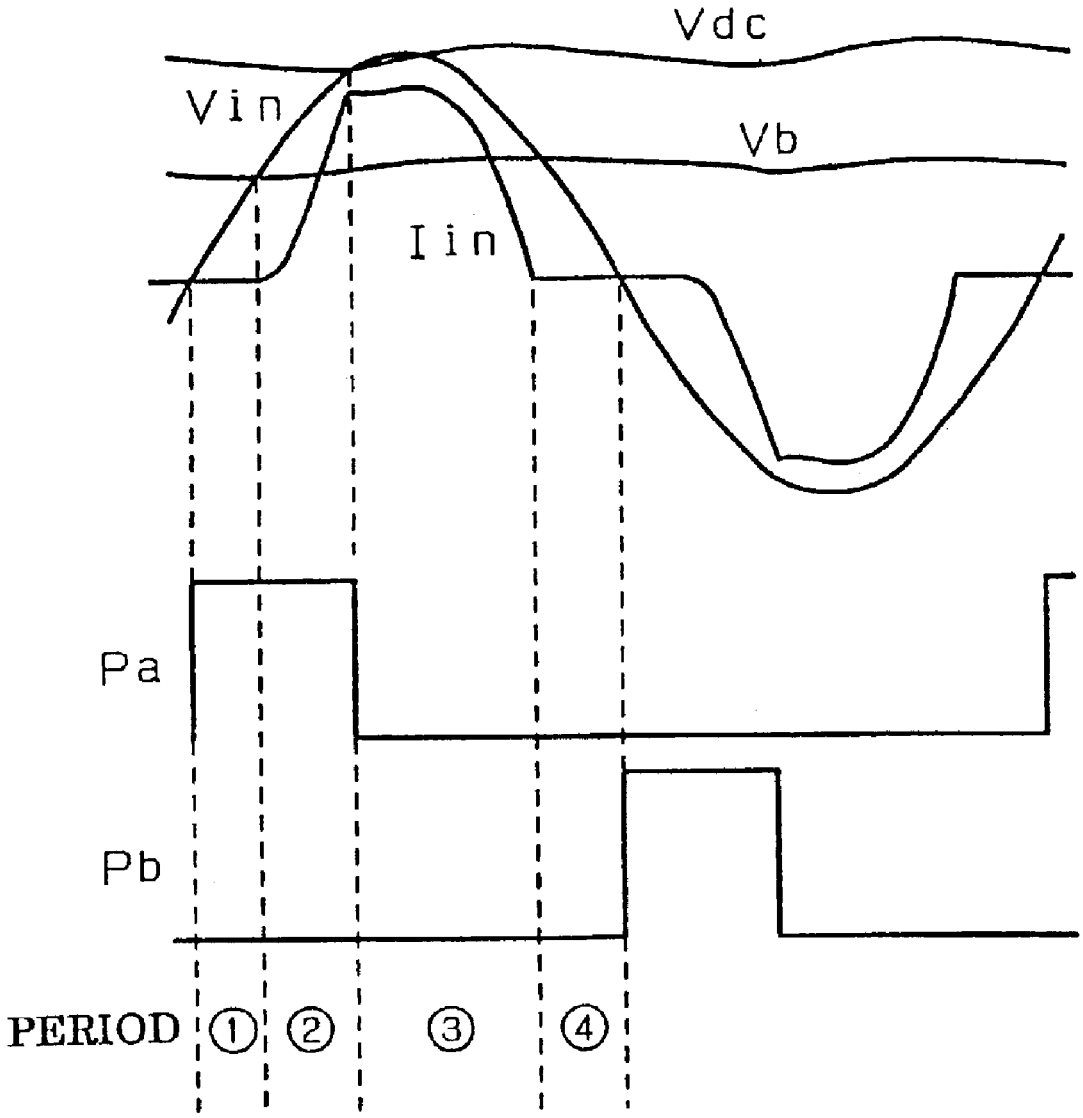
FIG. 15 is a view showing a pulse signal and its principal waveform in the power supply device according to the eighth embodiment of the present invention.

FIG. 14 is a circuit diagram showing a construction of a power supply device according to still another embodiment of the present invention. As shown in FIG. 14, the power supply device further includes a DC voltage detecting circuit 26 for detecting a voltage Vdc of the smoothing capacitor 8, in addition to the circuit construction shown in FIG. 13. The DC voltage detecting circuit 26 is composed of a resistor or the like. An output of the DC voltage detecting circuit 26 is captured in a microprocessor with the use of an A/D converter or the like. The DC voltage detecting circuit 26 may detect an output voltage of the power supply device or an output voltage of the power factor correction circuit 7. FIG. 15 is a view showing a pulse signal and a principal waveform in the power supply device of this eighth embodiment.

A positive half period of the power supply voltage is divided into four (4) periods, and an operation of each period will be described below with reference to FIGS. 7, 14 and 15.

Period ②: The pulse signal controller 22 outputs a pulse signal for turning on either of the switching elements 4a and 4b until the voltage value Vin of the AC power supply 1 becomes a value more than the voltage Vdc of the smoothing capacitor 8 in synchronous with the zero cross point of the voltage Vin of the AC power supply 1. In the example shown in FIG. 15, in a positive half period, a pulse signal Pa for turning on the switching element 4a is outputted. At this time, a voltage on the load side seen from the AC power supply 1 becomes equal to voltage Vb of the capacitor 5b and becomes a value of approximately ½ of the voltage Vdc of the smoothing capacitor 8. However, in this period, the power supply voltage Vin is lower than the voltage Vb of the capacitor 5b, and no current flows from the AC power supply 1 to the load side.

Period ②: The power supply voltage Vin becomes larger than the voltage Vb of the capacitor 5b, and therefore a charging current to the capacitor 5b starts to flow along a current flowing path as shown in FIG. 7A. Then, the current increases while the pulse signal continues on. In this interval, the power supply voltage Vin increases, and then, becomes equal to the voltage Vdc of he smoothing capacitor 8. At this time, the switching element 4a becomes an off state. The above operation is carried out by the pulse signal controller 22 which detects that the power supply voltage obtained from the supply voltage detecting circuit 25 is more than a DC voltage value obtained from the DC voltage detecting circuit 26, that is, the voltage Vdc of the smoothing capacitor 8.

Period ③: Two switching elements 4a and 4b are both in an off state, and a voltage on the load side seen from the AC power supply 1 becomes equal to the voltage Vdc of the smoothing capacitor 8. At this time, the power, supply voltage Vin is equal to the Vdc. Therefore, in order to charge the smoothing capacitor 8 with an increase of the power supply voltage Vin, the input current Iin flows along a current flowing path shown in FIG. 7C.

Period ④: The charge to the smoothing capacitor 8 is completed and to this period, no current flows, and then, the power supply device becomes a non-conductive state.

As described above, the operation from the Period ① the Period ④ can make early a rise of the input current Iin as compared with the conventional cast. Therefore, a current waveform having a wide conduction period can be obtained, and also, in a switch-over point of the Period ②and the Period ③, a smoother current waveform can be obtained without forming a sharp current waveform as shown in FIG. 6 of the third embodiment.

Moreover, in the negative half period of the AC power supply 1, the pulse signal controller 22 outputs a pulse signal Pb for turning on the switching elements 4b until the voltage value Vin of the AC power supply 1 becomes a value more than the voltage Vdc of the smoothing capacitor 8. In this case, the same operation as the positive half period is carried out, and thereby, a conduction period becomes wide, and it is possible to obtain a smoother current waveform having no sharpness.

Repeating the aforesaid operation for each period of the AC power supply 1 can enlarge a conduction period, and obtain a smoother current waveform having no sharpness. Therefore, a very high power factor can be obtained, and a harmonic distortion contained in the input current can be further reduced.

Therefore, in the power supply device of this eighth embodiment, it is possible to enlarge a conduction period of input current by a very simple control of outputting one-time pulse signal in the half period of the power supply voltage. Further, it is possible to optimize the timing of switching over the pulse signal from an on state to an off state, so that a sharpness of current waveform can be eliminated. As a result, a smoother current waveform can be obtained, and also, a harmonic distortion contained in the input current can be greatly reduced.

In addition, the power supply device generates a low noise, and it is possible to simplify a filter circuit, and further, switching is one time in a half period of the AC power supply 1. Therefore, a loss of the switching elements 4a and 4b can be reduced, and a low-loss power supply device can be realized. Incidentally, the following concept of this eighth embodiment is applicable to the power supply device shown in the first to seventh embodiments. The concept is to detect a voltage of the smoothing capacitor 8, and compare the power supply voltage Vin with the detected voltage Vdc of the smoothing capacitor 8, and this, to control a timing of the pulse signal.

Ninth Embodiment

Figure 16:
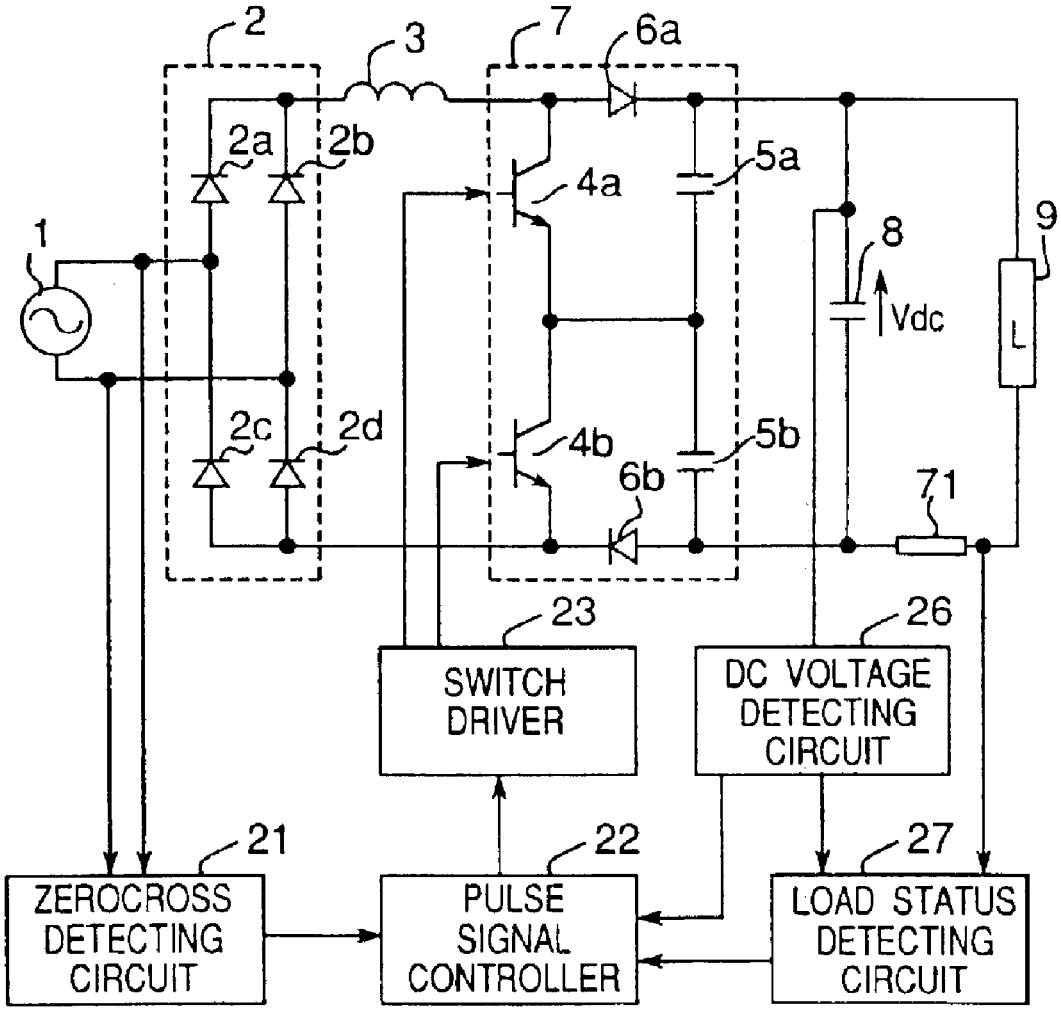
FIG. 16 is a circuit diagram showing a construction of a power supply device according to a ninth embodiment of the present invention.

FIG. 16 is a circuit diagram showing a construction of a power supply device according to still another embodiment of the present invention. As shown in FIG. 16, the power supply device further includes a DC voltage detecting circuit 26 for detecting a voltage Vdc of the smoothing capacitor 8 and a load status detecting circuit 27 for detecting a magnitude of load, to addition to the circuit construction shown in FIG. 3. The load status detecting circuit 27 determines a magnitude of load 9 based on the voltage Vdc of the smoothing capacitor 8 obtained from the DC voltage detecting circuit 26, and a load current obtained by a load current detecting circuit 71 which includes a resistor or a current transformer. The pulse signal controller 22 reads each output from the load status detecting circuit 27 and the DC voltage detecting circuit 26, and then, generates and outputs a pulse signal for driving the switching elements 4a and 4b.

The power supply device of this tenth embodiment will be described below in detail.

The pulse signal controller 22 changes a pulse width of a pulse signal for turning on the switching elements 4a and 4b, in accordance with a magnitude of load obtained from the load status detecting circuit 27. For example, in the pulse width control carried out in the power supply device of the third embodiment, the pulse width may be changed in proportional to a magnitude of load obtained from the load status detecting circuit 27. Further, a pulse width capable of maximizing a power factor or efficiency is preset based on a magnitude of a predetermined load. Then, a pulse signal having the preset predetermined pulse width may be outputted in accordance with a magnitude of the detected load. Furthermore, in the power supply device of the fourth embodiment, a pulse width is preset so that an output voltage is set to a predetermined value in accordance with a magnitude of load, and then, a pulse signal having the preset predetermined pulse width may be outputted in accordance with a magnitude of the detected load. In particular, the pulse signal controller 22 detects the voltage Vdc value of the smoothing capacitor 8 from the DC voltage detecting circuit 26, and thereby, it is confirmed whether a predetermined voltage is obtained, so that an output voltage can be more securely controlled.

The power supply device of this ninth embodiment can be combined with the power supply device shown in the above embodiments, and thereby the same advantage as the above invention can be obtained in all loads. Therefore, in the power supply device of this embodiment, a pulse width is changed in proportion to a magnitude of load. Thereby, it is possible to simplify a control, and to obtain a sufficiently high power factor in all loads. Thus it is possible to restrict a harmonic wave in all load by a simple control. Moreover, a pulse width capable of maximizing a power factor or efficiency is preset in accordance with a magnitude of a predetermined load, and then a pulse signal having the preset predetermined pulse width is outputted in accordance with a magnitude of the detected load Thus, it is possible to greatly improve a power factor or efficiency in all loads. Thus, a harmonic distortion can be greatly reduced. In addition, the harmonic can be restricted and a low-loss power supply device can be realized. Further, a pulse width is preset so that an output voltage is set to a predetermined value in accordance with a magnitude of load, and then, a pulse signal having the preset predetermined pulse width is outputted in accordance with a magnitude of the detected load, and thereby, it is possible to obtain an arbitrary output voltage to all range of the load. Thus it is possible to restrict a harmonic distortion, and to realize high power.

In this ninth embodiment, the load status detecting circuit 27 computes the voltage of the smoothing capacitor 8 obtained from the DC voltage detecting circuit 26, and a magnitude of load from a load current obtained from the load current detecting circuit 71 comprising a resistor or a current transformer. In the power supply device of the present invention, a load detecting method is not limited to the above method, and it can determine a load status from an output voltage, an output current, an input current and a current flowing through the switching means, as the detecting method. Further, combination of the aforesaid parameters can be used to detect a load.

Tenth Embodiment

Figure 17:
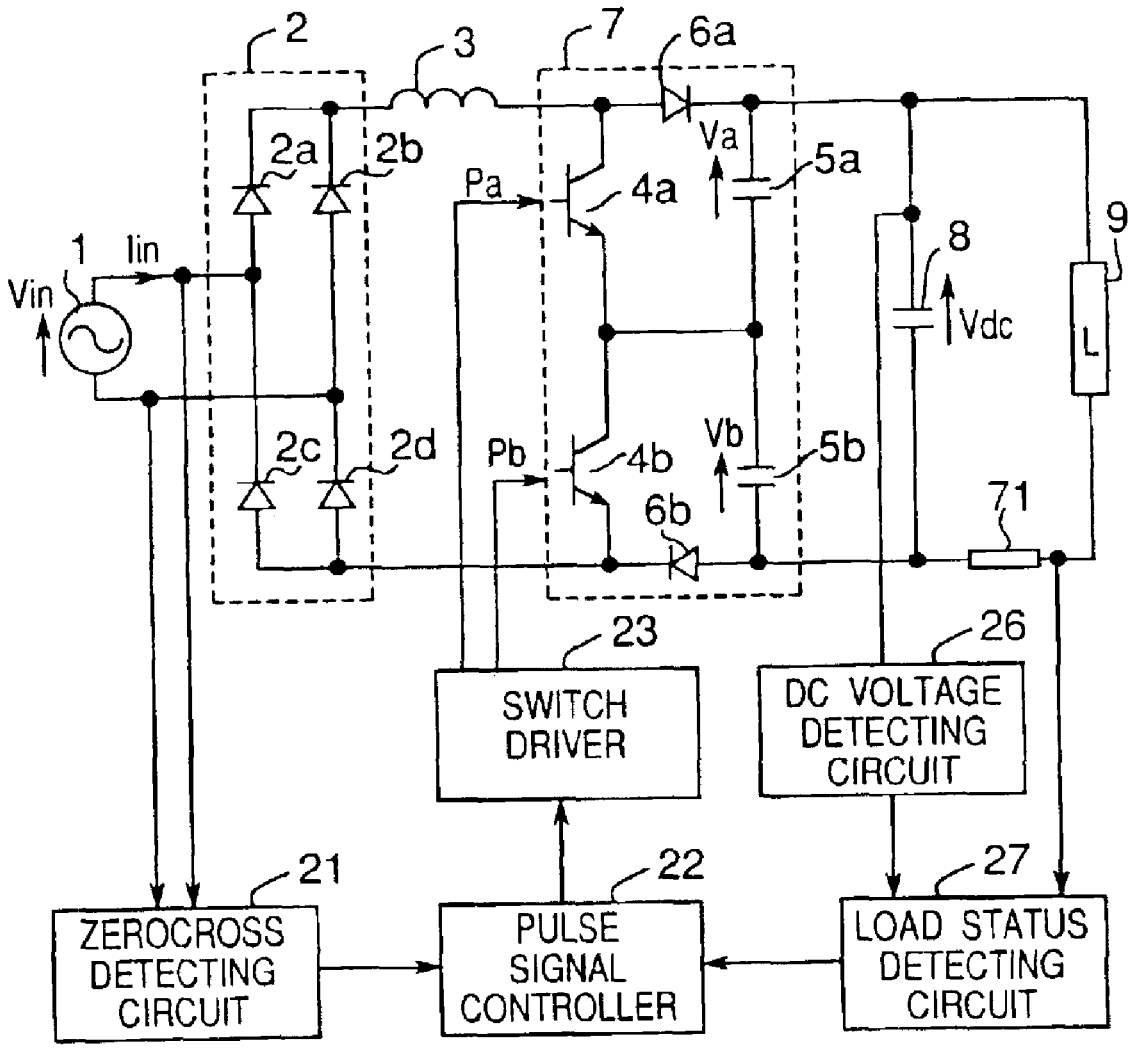
FIG. 17 is a circuit diagram showing a construction of a power supply device according to a tenth embodiment of the present invention.

FIG. 17 is a circuit diagram showing a construction of a power supply device according to still another embodiment of the present invention. The power supply device shown in FIG. 17 is different from the power supply device of the above ninth embodiment in that the pulse signal controller 22 outputs a pulse signal on the basis of only detection signal from the load status detecting circuit 27.

The power supply device shown in FIG. 17 will be described below in detail. The pulse signal controller 22 selects a pulse signal for turning on the switching elements 4a and 4b from any of pulse signal output patterns in the power supply devices shown in the above first to ninth embodiments in accordance with a magnitude of load obtained from the load status detecting circuit 27, and then, outputs it.

Figure 18A:
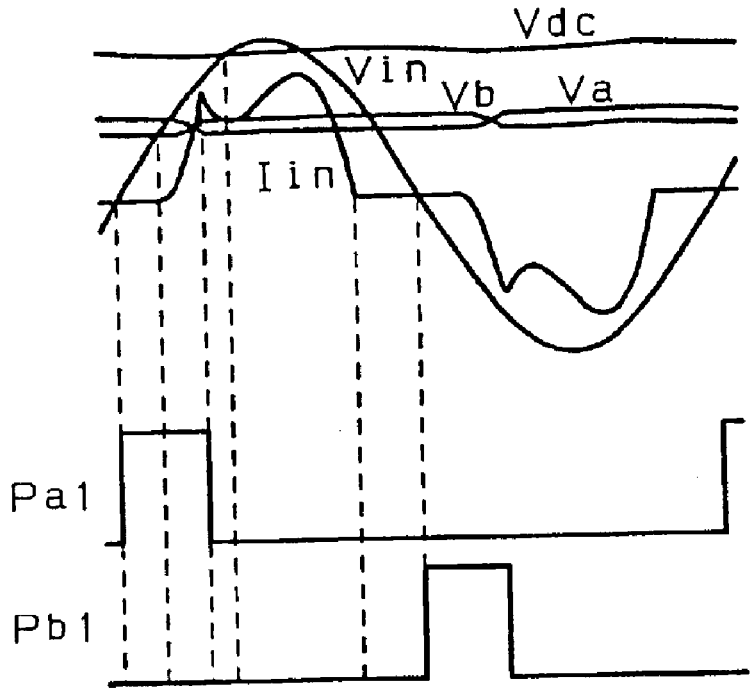
FIGS. 18A and 18B are views showing a pulse signal and its principal waveform in the power supply device according to the tenth embodiment of the present invention.
Figure 18B:
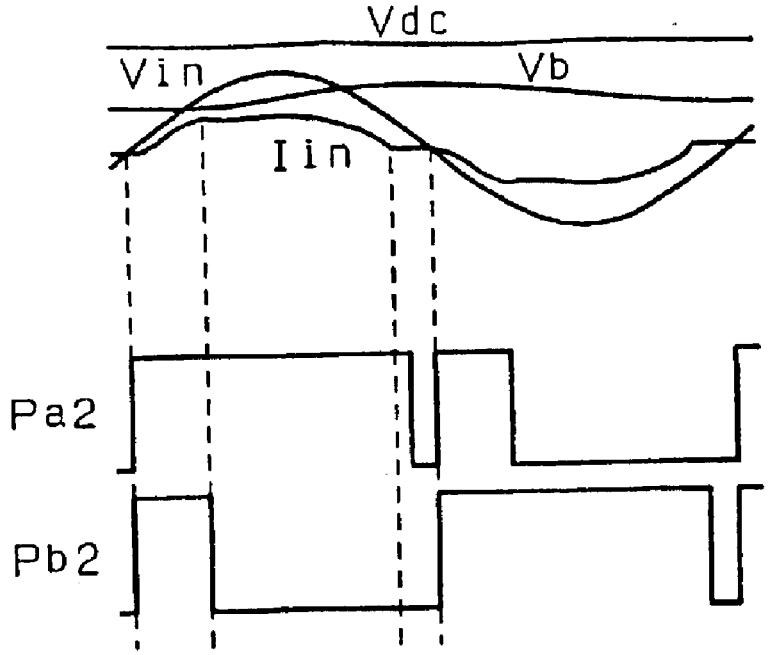

FIGS. 18A and 18B are views showing a pulse signal outputted by the pulse signal controller 22 and its principal waveform in the power supply device of this tenth embodiment. In FIGS 18A and 18B, "Pa1" and "Pa2" show a pulse signal for driving the switching element 4a, and "Pb1" and "Pb2" show a pulse signal for driving the switching element 4b.

In FIG. 17, in the case where a magnitude W of load detected by the load status detecting circuit 27 is equal to or less than a predetermined value Y1, a pulse signal of the output pattern shown in the third embodiment is outputted. On the other hand, in the case where the magnitude W of load is equal to or more than a predetermined value Y1, a pulse signal of the output pattern shown in the fourth embodiment is outputted.

More specifically, in the case of $W \leqq Y1$, the pulse signal controller 22 outputs a pulse signal Pa1 and Pb1 as shown in FIG. 18A. In the case of $W \geqq Y1$, the pulse signal controller 22 outputs a pulse signal Pa2 and Pb2 as shown in FIG. 18B.

Thus, in a region where the load W is equal to or less than a predetermined value Y1 ($W \leqq Y1$), high power factor is obtained, and an output voltage can be kept substantially constant that is, to a voltage obtained by full wave rectification. Moreover, in a region where the load W is equal to or more than a predetermined value Y1, it is possible to obtain high power factor, and an output voltage having a voltage value larger than a voltage obtained by voltage doubler rectification. As a result, an output voltage can be changed in accordance with a magnitude of the load.

In a region of $W \geqq Y1$, as shown in the ninth embodiment, widening a pulse width in proportion to the magnitude W of load can gradually change the output voltage from a voltage obtained by full wave rectification to a voltage value lager than a voltage obtained by voltage doubler rectification.

Moreover, in another predetermined value Y2 may be preset and the pulse signals may be both turned off when the magnitude of load is equal to or less than Y2. More specifically, in the case of $W \leqq Y2$, the pulse signal controller 22 outputs no pulse signal. On the other hand, in the case of $Y2 \leqq W \leqq Y1$, the pulse signal controller 22 outputs the pulse signals Pa1 and Pb1 as shown in FIG. 18A. Further, in the case of $W \geqq Y1$, the pulse signal controller 22 outputs the pulse signals Pat and Pb2 as shown in FIG. 18B.

Thus, in this embodiment, in the region where the magnitude W of load is equal to or less than Y2, there is no current flow (conduction) to the switching elements 4a and 4b. Therefore, it is possible to reduce a loss in the switching element and realize a low-loss power supply device.

Therefore, in the power supply device of this tenth embodiment, the magnitude W of load is compared with a predetermined value, and a pulse signal to the outputted is changed in accordance with the magnitude of the load. Thereby, it is possible to obtain high power factor in a whole range of the loud, and to restrict a harmonic distortion. Further in output voltage is changed in accordance with the magnitude of load. Moreover, the pulse signal is turned off in a low load area, and thereby, a loss can be further reduced.

As a result, with respect to a load whose magnitude varies, it is possible to restrict a harmonic distortion in all variable range of the load and vary an output voltage to realize high power.

The circuit construction and control of the power supply device are simplified. Therefore, a switching noise becomes small, and a filter circuit is simplified, and further a toss in the switching means becomes small. Thus a low-loss power supply device can be provided.

Combination of the pulse signal output pattern of the power supply device of this tenth embodiment may be used in the power supply devices shown in the first to ninth embodiments.

In this tenth embodiment, the load status detecting circuit 27 determines a magnitude of load, the voltage of the smoothing capacitor 8 obtained from the DC voltage detecting circuit 26, and a load current obtained from the load current detecting circuit 71. In the power supply device of the present invention, a load detecting method is not limited to the above method, for example, it is possible to determine a load from an output voltage, an output current, an input current of the power supply device, a current flowing through the switching element, pulse width or the combination thereof to detect the brad.

Eleventh Embodiment

Figure 19:
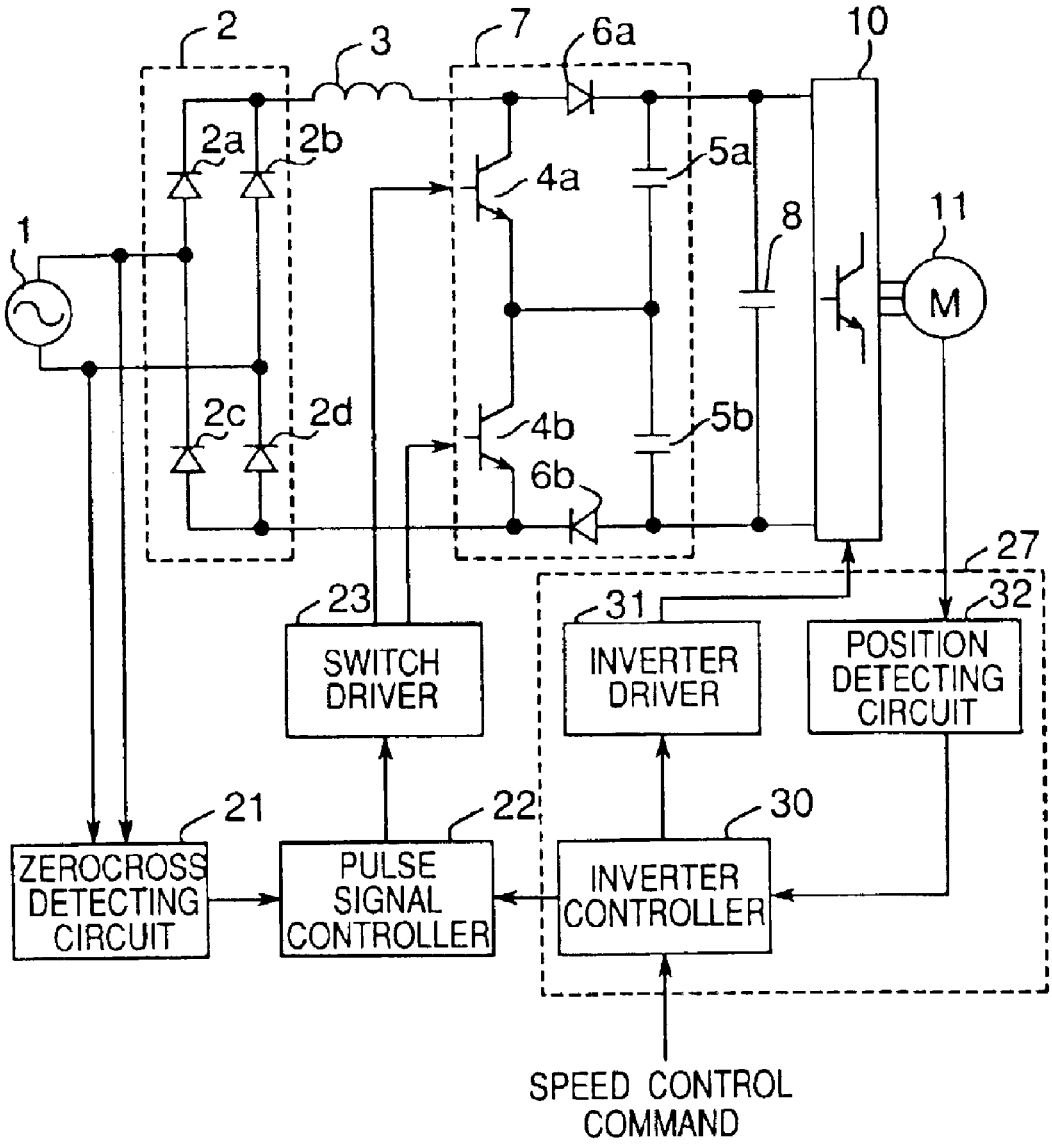
FIG. 19 is a circuit diagram showing a construction of a power supply device according to a eleventh embodiment (and twelfth embodiment) of the present invention.

FIG. 19 is a circuit diagram showing a construction of a power supply device according to still another embodiment of the present invention. As shown in FIG. 19, the power supply device includes an inverter 10 and a load status detecting circuit 27, in addition to the circuit configuration shown in FIG. 3. The inverter 10 is composed of a plurality of semiconductor elements, and the semiconductor elements are switched over according to a high frequency. Thereby, a substantially DC voltage Vdc of the both terminals of the smoothing capacitor 8 is converted into an AC voltage of a variable voltage/variable frequency. Self arc-extinguishable semiconductors such as a power transistor, a power MOSFET, IGBT are used as the semiconductor element, like the switching elements of the power factor correction circuit 7. The AC voltage of variable voltage/variable frequency outputted by the inverter 10 is supplied to a motor 11 so that the motor 11 is driven at a variable speed. .A DC brushless motor is used as the motor 11.

Moreover, the load status detecting circuit 27 is composed of an inverter controller 30, an inverter driver 31 and a position detecting circuit 32. The position detecting circuit 32 detects a rotor position of the motor 11, that is, the DC brushless motor, and outputs a positional detection signal.

The position detecting circuit 32 comprises a Hall sensor, an encoder or the like. The inverter controller 30 generates and outputs a control signal for driving the inverter 10 on the basis of the positional detection signal from the position detecting circuit 32, and comprises a microprocessor or the like. The inverter driver 31 drives the semiconductor element of the inverter 10 on the basis of the control signal generated and outputted by the inverter controller 30.

The pulse signal controller 22 generates and outputs a pulse signal for driving the switching elements 4a and 4b, and also, in this eleventh embodiment, reads a load state detected by the inverter controller 30 which is one of components of the load status detecting circuit 27.

The power supply device shown in FIG. 19 will be described below in detail the inverter controller 30 receives an external speed command signal and a positional detection signal from the position detecting circuit 32, and generates a control signal for driving the inverter 10 in order to control the motor to a predetermined speed.

To give act example of the motor 11 which is driven at a variable speed by the inverter 10, there is a motor for compressor used in an air conditioner. In the motor for compressor, a load torque increases in accordance with a magnitude of speed, and a counter electromotive voltage generated in a motor winding increases. Therefore a voltage and a current applied to the motor 11 become large, and an output power increases. With an increase of output power, an input power and an input current by the AC power supply are also increased.

On the other hand, in the power factor correction circuit 7, in order to improve a power factor of input current, the pulse signal controller 22 outputs a pulse signal for driving the switching elements 4a and 4b. However, a power factor or efficiency of the power supply device depends greatly on a pulse width of the pulse signal. Therefore, in order to maximize the power factor or efficiency, there is a need of outputting a pulse signal having an optimum pulse width. The optimum pulse width differs depending upon a magnitude of load, a circuit constant or the like.

In an all load variable range of the motor 11, in order to obtain the maximum power factor or efficiency, it is important to control a pulse width of the pulse signal in accordance with a magnitude of load. In this embodiment, the following method is used as a method for detecting a magnitude of load. In the method, a computation is carried out based on a speed of the motor 11 obtained from a detection interval of die positional detection signal outputted by the position detecting circuit 32.

Figure 20:
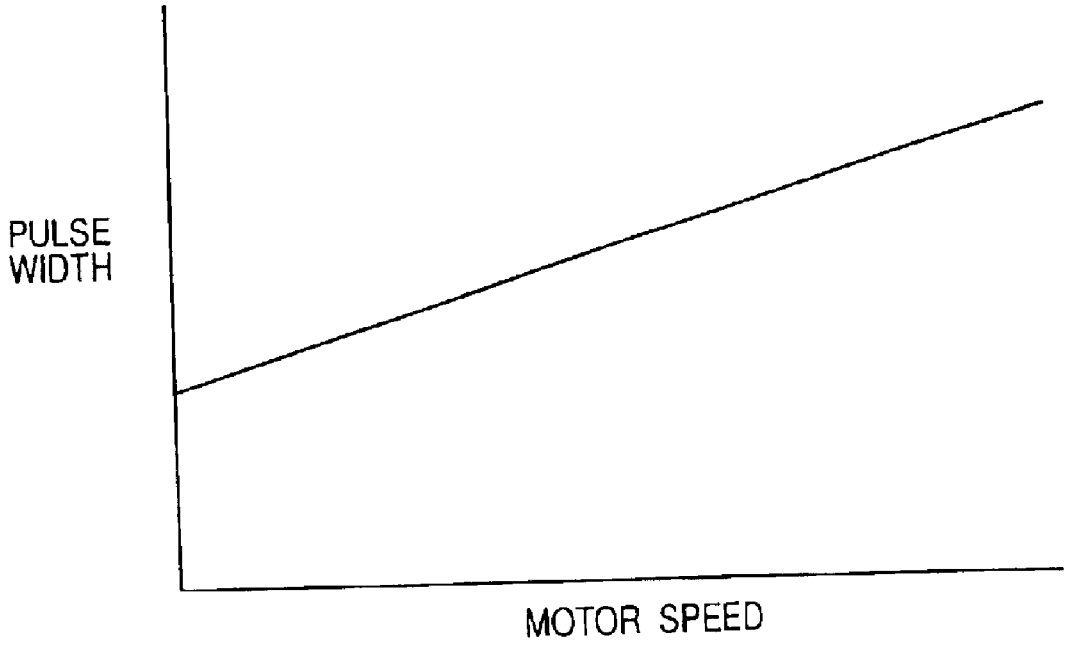
FIG. 20 is a view showing a relationship between a motor speed and a pulse width of a pulse signal outputted by pulse signal control means.

For example, a pulse width capable of maximizing a power factor or efficiency is preset with respect to a speed of the motor 11. Then, the pulse signal controller 22 may output a pulse signal having a preset predetermined pulse width in accordance with the detected speed of the motor 11. Moreover, when the optimum pulse width is proportional substantially to a speed of the motor 11, as shown in FIG. 20, the pulse signal controller 22 may control a pulse width of the pulse signal in proportion to the detected speed of the motor 11.

In the power supply device of this embodiment, the magnitude of load is computed based on the speed of the motor 11, and a pulse width capable of maximizing a power factor or efficiency is preset with respect to the speed of the motor 11, and further, a predetermined pulse signal is outputted in accordance with the speed of the motor 11. Therefore, it is possible to obtain a sufficient power factor or efficiency in all operating ranges of the motor 11. Whereby it is possible to sufficiently reduce a harmonic distortion contained in an input current in all operating ranges of the motor 11, and to realize a low-loss power supply device for driving a motor. In addition, a switching noise can be small, and it is possible to restrict an increase of loss in a filter circuit and the switching elements 4a and 4b.

Moreover, when the optimum pulse width is proportional substantially to a speed of the motor 11, the pulse width of the pulse signal is controlled in proportion to the detected speed of the motor 11. Therefore, likewise, it is possible to obtain a sufficient power factor or efficiency in all operating ranges of the motor 11. In this case, since the pulse width of the pulse signal is represented as a linear expression to the speed of the motor 11, a pulse width control can be further simplified. Therefore in all operating ranges of the motor 11, it is possible to sufficiently reduce a harmonic distortion contained to an input current by a simple control, and to realize a low-loss power supply device for driving a motor.

Twelfth Embodiment

A power supply device according to still another embodiment of the present invention will be described below with reference to FIG. 19, FIG. 21, FIG. 22 and FIG. 23.

In this twelfth embodiment, a magnitude of load of the motor 11 is detected on the basis of a magnitude of an input current of the AC power supply 1. The magnitude of the input current increases in accordance with the magnitude of load of the motor 11, the input current is detected by an input current detecting circuit (not shown) such as a resistor and a current transformer provided on a current flowing path. In the following description, an Operation mode by the pulse signal shown in the third embodiment is referred to as "full wave rectification mode", and an operation mode by the pulse signal shown in the fourth embodiment is referred to as "voltage doubler rectification mode".

Figure 21:
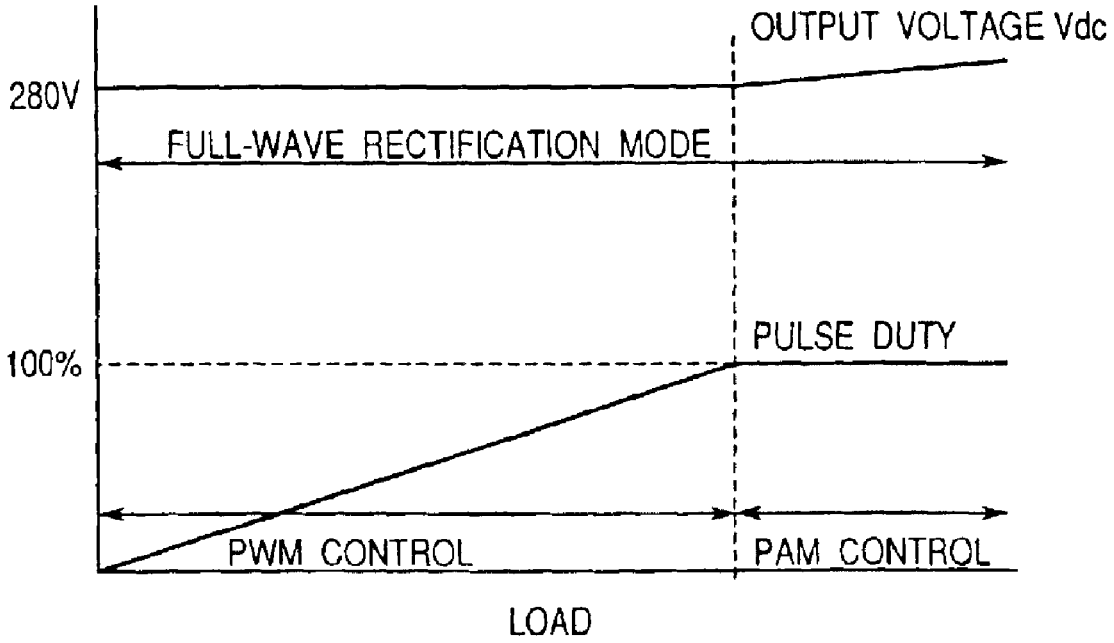
FIG. 21 is a view showing a control mode of a power factor correction circuit with respect to a load and a motor speed control by an inverter.

In FIG. 21, after the motor 11 starts up, the pulse signal controller 22 of the power factor correction circuit 7 curies out a power factor correction in the full wave rectification mode. In this case, for example, a voltage of the AC power supply 1 is 200V, the voltage Vdc of the smoothing capacitor 8 becomes about 280V.

When the load of the motor 11 increases, the input current also increases. The pulse signal controller 22 controls a pulse width of the pulse signal in accordance with a magnitude of the load, that is, a magnitude of the input current so as to maximize a power factor or efficiency. In this interval, in order to control the motor to a predetermined speed on the basis of a speed command signal from the external. The inverter controller 30 carves out an inverter PWM (Pulse Width Modulation) control for controlling the motor 11 to a predetermined speed. That is, the inverter controller 30 controls a pulse duty of a high frequency pulse signal for driving each semiconductor element of the inverter 10 to adjust a voltage applied to the motor 11.

Figure 22:
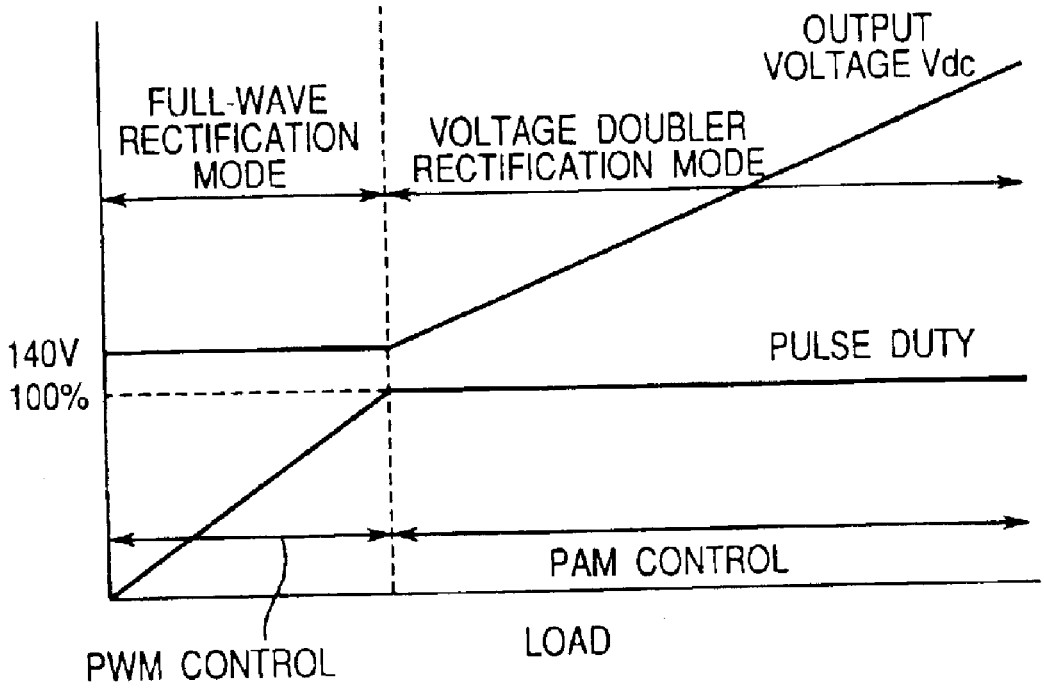
FIG. 22 is a view showing a control mode of a power factor correction circuit with respect to a load and a motor speed control by an inverter.

Then, with an increase of the load, when the pulse duty of the high frequency pulse signal outputted by the inverter controller 30 reaches a predetermined value, for example, 100%, a voltage supply to the motor 11 becomes saturated, and the speed of the motor is not increased any more. Therefore, in order to further supply a high voltage to improve the speed of the motor 11, it needs to increase an output voltage of the power factor correction circuit 7, that is, the voltage Vdc of the smoothing capacitor 8. After that, the voltage Vdc of the smoothing capacitor 8 is controlled by a pulse signal control by the power factor correction circuit 7 by the pulse signal controller 22 so that a voltage applied to the motor is adjusted, and thereby, an inverter PAM (Pulse Amplitude Modulation) control for controlling the motor 11 to a predetermined speed is carried out, Next, another control method in this embodiment will be described below with reference to FIG. 22. In FIG. 22, after the Motor 11 starts up, the pulse signal controller 22 of the power factor correction circuit 7 carries out a power factor correction in the full wave rectification mode. In this case, for example, when a voltage of the AC power supply 1 is 100V, the voltage Vdc of the smoothing capacitor 8 becomes about 140V.

When the load of the motor 11 increases, the input current also increases. The pulse signal controller 22 controls a pulse width of the pulse signal in accordance with a magnitude of the load, that is, a magnitude of the input current to maximize a power factor or efficiency. In this interval, the inverter controller 30 carries out the inverter PWM control for controlling the motor 11 to a predetermined speed on the basis of the speed command signal from the external.

Then, with an increase of the load, when the pulse duty of the inverter 10 reaches a predetermined value, for example, 100%, a voltage supply to the motor 11 becomes a saturated state, and the speed of the motor is not increased any more. Whereupon the voltage Vdc of the smoothing capacitor 8 is controlled according to a pulse signal control by the power factor correction circuit 7 controlled by the pulse signal controller 22 so that a voltage applied to the motor is adjusted, and thereby, the inverter PAM control for controlling the motor 11 to a predetermined speed is carried out.

However, when the voltage value of the AC power supply 1 is 100V, in the full wave rectification mode, there is the limit in a control range of the output voltage Vdc, that is, in a supply to the motor 11. Therefore it is impossible to sufficiently accelerate the speed of the motor. So, the pulse signal controller switches over the pulse signal to be outputted from the full wave rectification mode to the voltage doubler rectification mode, and thereby a greater voltage boos effect can be obtained. In this voltage doubler rectification mode, the output voltage Vdc is controlled by a pulse width of two pulse signals outputted by two switching elements 4a and 4b of the power factor correction circuit 7. A great voltage boost effect to the voltage doubler rectification mode can provide the same output voltage Vdc in input of 100V as output voltage to the input of 200V. Thus the inverter PAM control can be performed in a wider range.

Figure 23:
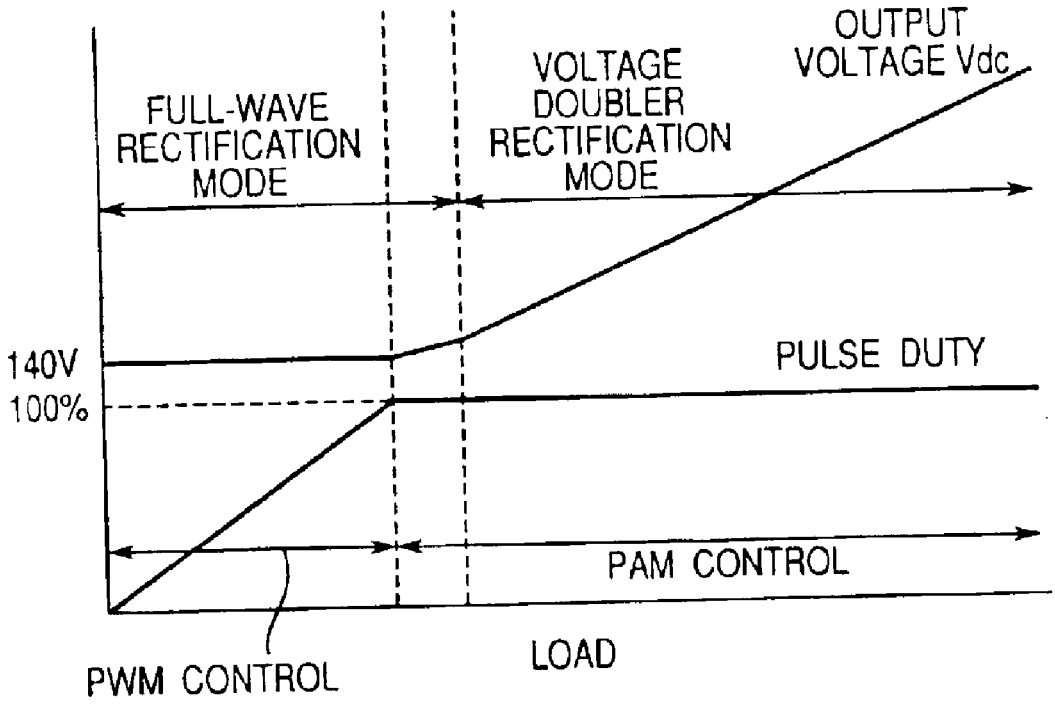
FIG. 23 is a view showing a control mode of a power factor correction circuit with respect to a load and a motor speed control by an inverter.

The switch-over from the full wave rectification mode to the voltage doubler rectification mode may not be always carried out at the point at which the pulse duty of the high frequency pulse signal outputted by the inverter controller 30 reaches 100%. As shown in FIG. 23, a switchover of the mode may be after and before the point at which the pulse duty ratio reaches 100%.

Moreover, a hysteresis is provided at the switchover point from the full wave rectification mode to the voltage doubler rectification mode. Thus it is possible to prevent a mode change from being complicated carried out due to an unstable operation in the vicinity of the switchover point of mode.

In the power supply device of this embodiment, in addition to power factor correction in the full wave rectification mode by the pulse signal controller 22, the speed of the motor 1 is controlled by the inverter PWM control in a region where a load acting on the motor 11 is small, and is controlled by the inverter PAM control in a region, where the load is large. Therefore, a sufficient power factor is obtained in all operating ranges of the motor 11, and in particular, it is possible to restrict a switching loss in an inverter PAM control region. It is therefore possible to realize a low-loss inverter 10 and motor 11. In addition, the output voltage Vdc can be improved.

Whereby it is possible to sufficiently restrict a harmonic distortion of the input current in all operating ranges of the motor 11, and to realize a power supply device which can drive the motor 11 having high efficiency and high power. In addition, a switching noise can be small, and it is possible to restrict an increase of loss in a filter circuit and the switching elements 4a and 4b with a simple control.

Moreover, in a region where a load acting on the motor 11 is small, power factor correction by the full wave rectification mode and a speed control of the motor 11 by the inverter PWM control are carried out. In a region where the load is large, power factor correction by the voltage double rectification mode and a speed control of the motor 11 by the inverter PAM control are carried out. Therefore, a sufficient power factor is obtained in all operating ranges of the motor 11, and the inverter PAM control is carved out in a wide range by a voltage boost effect of the voltage doubler rectification mode. Consequently, it is possible to depress an increase in switching loss of the inverter 10 and the motor 11, and to greatly improve the output voltage Vdc.

Whereby it is possible to realize a power supply device which can sufficiently restrict a harmonic distortion of the input current in ail operating ranges of the motor 11, and can drive the motor 11 having high efficiency and high power in a wide range. In addition, a switching noise becomes small, and it is possible to restrict an increase of loss in a filter circuit and the switching elements 4a and 4b with a simple control.

In this twelfth embodiment, a pattern of the pulse signal outputted by the pulse signal controller 22 is not limited to one in this embodiment. The output pattern may be selected from the arbitrary combination of patterns of above embodiments as required. Moreover, in the above eleventh and twelfth embodiments, the motor 11 uses the DC brushless motor. The motor used in the power supply device of the present invention is not limited to the DC brushless motor, and the same effect can be obtained in other motors such as an induction motor or the like. The load status detecting circuit 27 is not limited to the construction shown in FIG. 19. In the above eleventh and twelfth embodiments, the speed of the motor 11 and a magnitude of the input current of the AC power supply 1 have been used in a method of detecting the load status. The parameters such as an output pulse duty of the inverter 10, an output frequency, an output current value, a voltage and current applied to the motor 11, may be used. In addition, combination of these parameters may be used to detect a magnitude of load. The same elect can be obtained.

Thirteenth Embodiment

Figure 24:
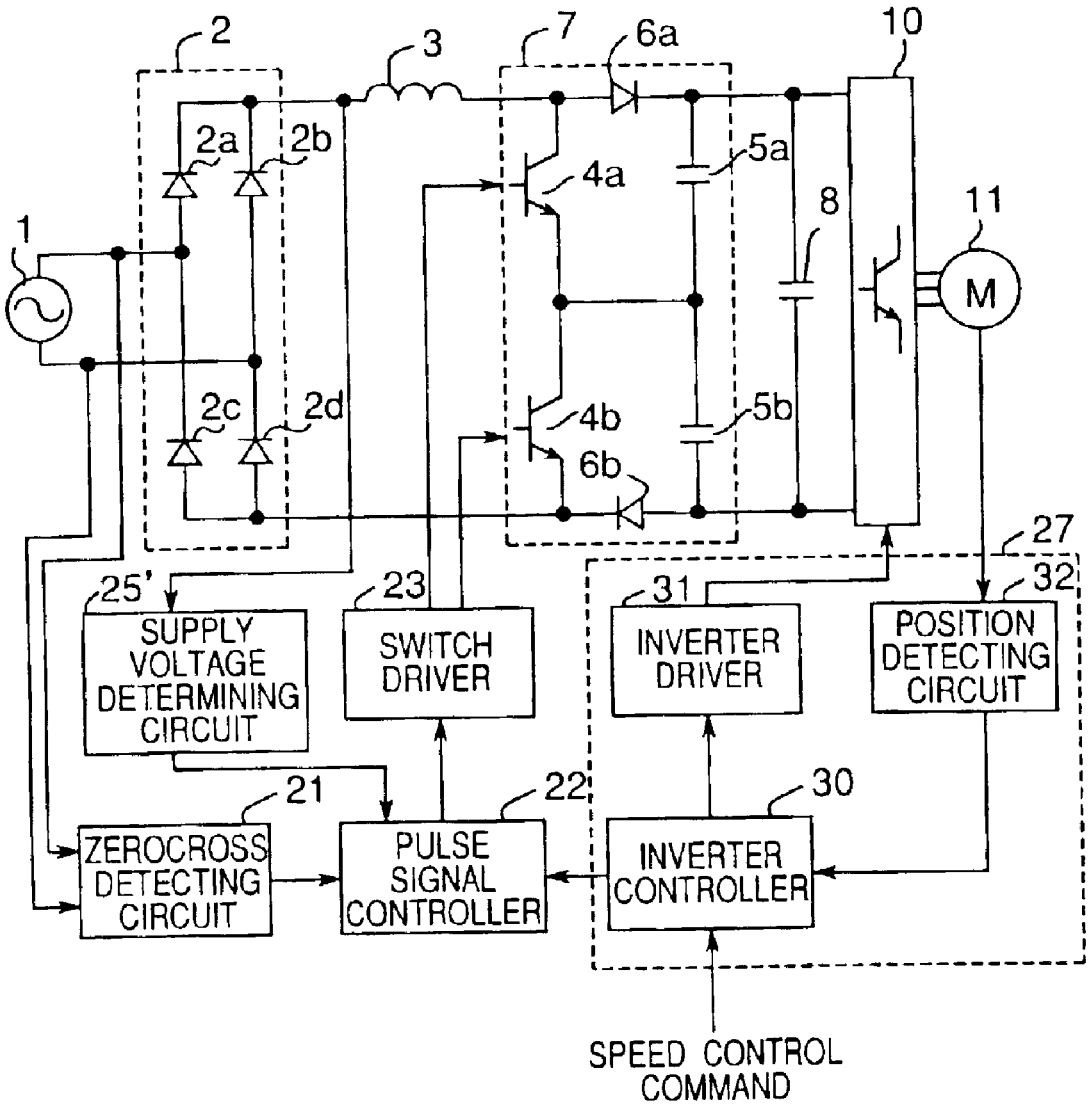
FIG. 24 is a circuit diagram showing a construction of a power supply device according to a thirteenth embodiment of the present invention.

A power supply device according to still another embodiment of the present invention will be described below with reference to FIG. 24. The power supply device of this embodiment includes a power supply voltage determining circuit 25, in addition to the circuit construction shown in FIG. 23. The pulse signal controller 22 generates and outputs a pulse signal for driving the switching elements 4a and 4b, and in this embodiment, reads a voltage of the AC power supply 1 detected by the power supply voltage determining circuit 25 and a load status detected by the inverter controller 30 which is one component of the toad status detecting circuit 27.

The power supply device shown in FIG. 24 will be described below in detail. The power supply voltage, determining mining circuit 25 detects a voltage of the AC power supply 1 from a ripple voltage which is an output of the rectifier circuit 2 and compares the detected voltage with a predetermined value. When the detected voltage value is determined to be 200V by the comparison, a control suitable for the operation with the supply voltage of 200V is carried out That is, the pulse signal controller 22 controls the pulse signal to improve a power factor in the full wave rectification mode as shown in FIG. 21. The inverter controller 30 carves out the inverter PWM control in low and intermediate load regions and carries out the inverter PAM control in a high load region. Thus, a speed of the motor 11 can be controlled.

When the voltage determined by the power supply voltage determining circuit 25' is 100V, a control suitable for the operation with supply voltage of 100V is carried out. As shown in FIG. 22 or 23, in a low load region, the pulse signal controller 22 controls output pulse signal so as to improve a power factor in the full wave rectification mode, and the inverter controller 30 carries out the inverter PWM control. In intermediate and high load regions, the pulse signal controller 22 carries out a power factor correction in the voltage doubler rectification mode, and the inverter controller 30 carries out the inverter PAM control.

In the power supply device of this embodiment, the control method of the power factor correction circuit and inverter 10 is switched in accordance with the voltage of the AC power supply 1 detected by the supply voltage determining circuit 25'. Therefore, it is possible to obtain a sufficient power factor in all operating ranges regardless of the voltage value of the AC power supply 1. In addition, it is possible to reduce a loss, and to improve the output voltage Vdc.

Thus, even in the case where the voltage value of the AC power supply 1 is 100V or 200V, it is possible to realize a power supply device in a same circuit configuration for the power supply of 100V or 200V which can sufficiently restrict a harmonic distortion in all operating ranges of the motor 11 and can drive the motor 11 in high efficiency with high power. In addition, a switching noise can be small, and it is possible to restrict an increase of loss in a filter circuit and the switching elements 4a and 4b with a simple control.

In this embodiment, the control method shown in FIG. 22 or 23 has been employed in the case where the voltage value of the AC power supply 1 is 100V, and the control method shown in FIG. 21 has been employed when the voltage of the AC power supply 1 is 200V Other control methods however may be combined to be used.

Fourteenth Embodiment

A power supply device according to still another embodiment of the present invention will be described below with reference to FIG. 5. The power supply device of this embodiment further includes a power-supply frequency detecting circuit 28 for detecting a frequency of the AC power supply 1 to output a frequency detection signal, in addition to the circuit construction shown in FIG. 3. The pulse signal controller 22 generates and outputs a pulse signal for driving the switching elements 4a and 4b, and also, reads the frequency detection signal from the power-supply frequency detecting circuit 28.

Figure 25:
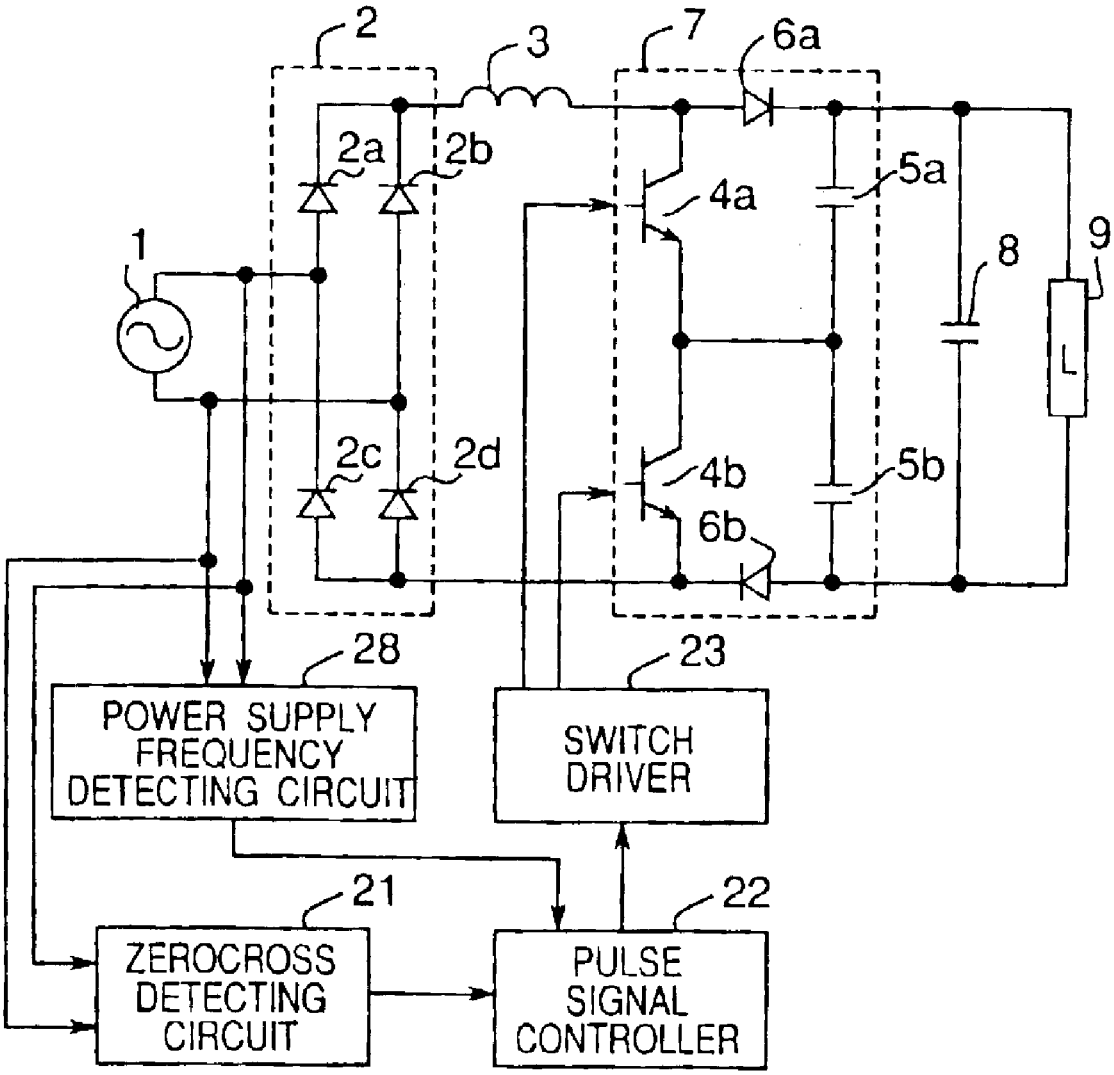
FIG. 25 is a circuit diagram showing a construction of a power supply device according to a fourteenth embodiment of the present invention.

The power supply device shown in FIG. 25 will be described below in detail. In the case where the AC power supply 1 is a commercial power supply, its frequency is either 50 Hz or 60 Hz. Time lengths of one period in these frequency are different each other. Therefore, even if a magnitude of the load 9 is the same, an optimum pulse width capable of maximizing a power factor or efficiency is different in each frequency.

Thus, in order that the power supply device obtains a sufficient power factor or efficiency regardless of the frequency of the AC power supply 1, the pulse signal controller 22 must output a pulse signal having the optimum pulse width corresponding to each frequency.

Figure 26:
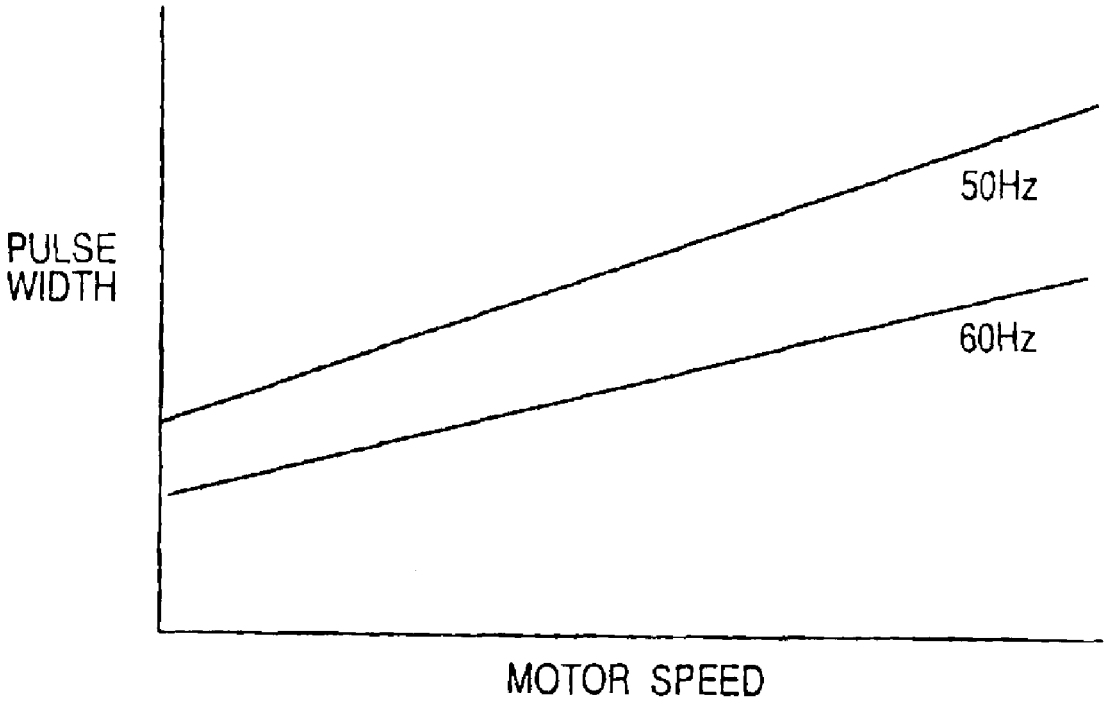
FIG. 26 is a view showing a relationship between a motor speed and a pulse width of a pulse signal outputted by pulse signal control means.

In the power supply device of this embodiment, as shown in FIG. 26, an optimum pulse width capable of maximizing a power factor or efficiency is preset for each frequency of the AC power supply 1. The pulse signal controller 22 receives the frequency detection signal of the AC power supply 1 detected by the power-supply frequency detecting circuit 28, and then, outputs the optimum pulse signal in the previously set pulse signals which corresponds to the detected frequency. Or a reference frequency is preset, and in optimum pulse signal corresponds to the reference frequency is preset. Then, in the case where the frequency detected by the power-supply frequency detecting circuit 28 is different from the reference frequency, the pulse signal corresponding to the preset reference frequency is computed based on a predetermined ratio, and thereby, a brief optimum pulse signal is obtained. For example, in the case where the reference frequency is 60 Hz and a frequency detected by the power-supply frequency detecting circuit 28 is 50 Hz, a preset pulse signal is computed on the basis of a predetermined ratio (e.g., 60 Hz/50 Hz=1.2 times) to obtain an optimum pulse signal to 50 Hz, and then, the pulse signal is then outputted.

In the power supply device of this embodiment, a pulse width capable of optimizing a power factor or efficiency is preset for each frequency of the AC power supply 1 , and the pulse signal controller 2 outputs a pulse signal having an optimum pulse width corresponding to each detected frequency. Therefore, it is possible to obtain a sufficient power factor or efficiency regardless of a frequency of the AC power supply 1. Whereby it is possible to sufficiently restrict a harmonic distortion of the input current without performing setting and modification in accordance with a frequency of the AC power supply 1.

Moreover, an optimum pulse signal corresponding to a reference frequency is preset, and when the detected frequency is different from the reference frequency, the pulse signal controller 22 outputs a pulse signal which is computed with respect to a preset reference pulse signal at a predetermined ratio. Therefore, it is possible to obtain a sufficient power factor or efficiency regardless of a frequency of the AC power supply 1. Whereby it is possible to obtain a sufficient power factor or efficiency regardless of a frequency of the AC power supply 1 without setting pulse signals for all frequencies.

In this embodiment, not only the optimum pulse signal is preset in accordance with a magnitude of load, but also a pulse width of the pulse signal is varied in proportion to the magnitude of load. Thus, it is possible to readily carry out a pulse control in accordance with a frequency of the AC power supply 1. Further, in this embodiment, the power-supply frequency detecting circuit 28 is provided. A frequency of the AC power supply 1 however may be computed based on a detection interval of the zero cross detection signal outputted by the zero cross detecting circuit 21. The same advantage can be obtained as one in the other embodiments.

Fifteenth Embodiment

Figure 27:
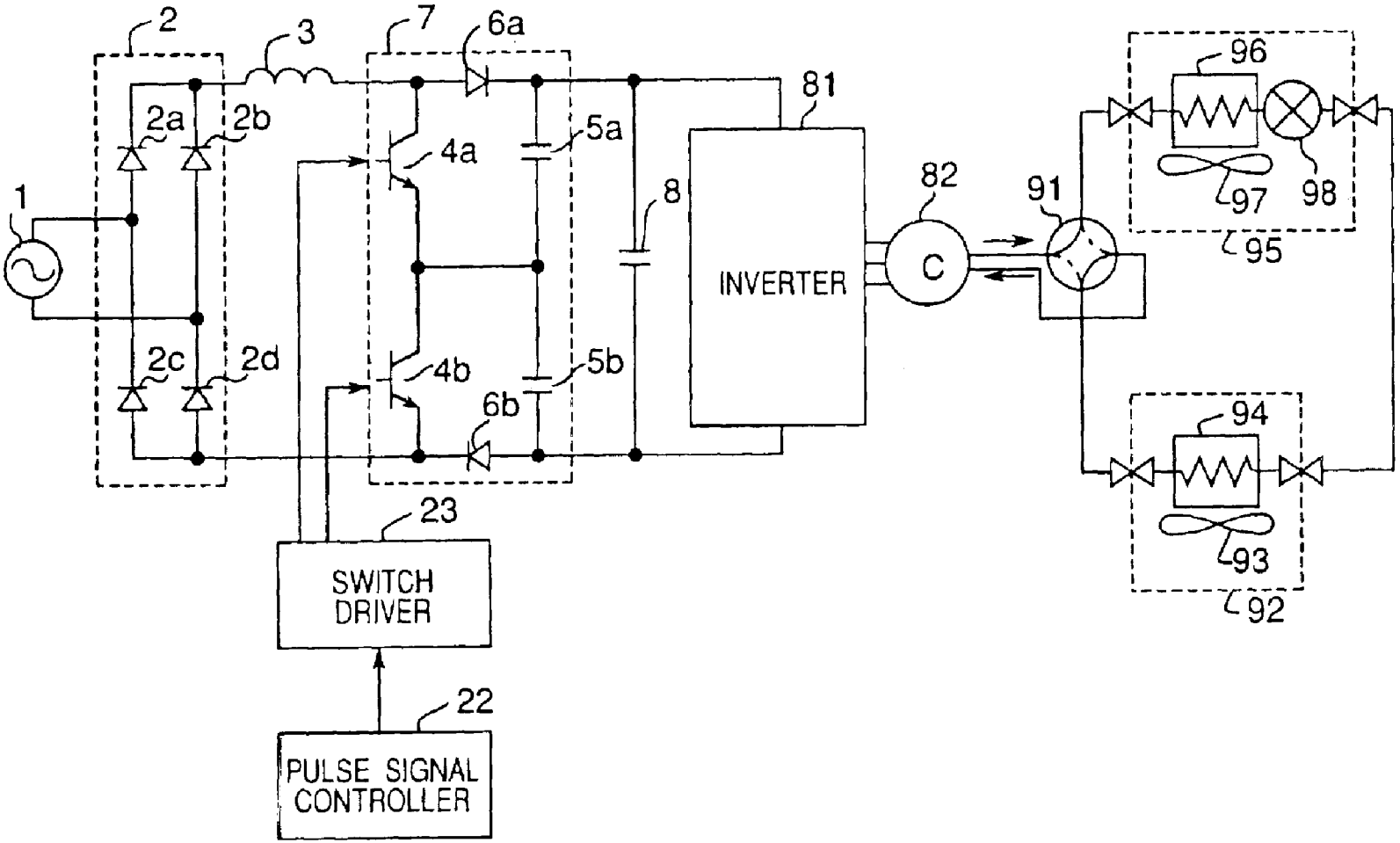
FIG. 27 is a block diagram showing a construction of an air conditioner according to one embodiment of the present invention.

FIG. 27 shows one example of an air conditioner to which any of the power supply devices of the present invention is applied. As shown in FIG. 27, the air conditioner uses the power supply device shown in the first embodiment as a converter. The air conditioner includes an inverter 81, a power-driven compressor 82 and a refrigeration cycle. The refrigeration cycle comprises an indoor unit 92, an outdoor unit 95 and a four-way valve 91. The indoor unit 92 comprises an indoor beat exchanger 93 and an indoor fan 94. The outdoor unit 95 comprises an outdoor heat exchanger 96 an outdoor fan 97 and the expansion valve 98. A refrigerant which carries a heat circulates through the refrigeration cycle. The refrigerant is compressed by the power-driven compressor 82 and then makes a heat exchange with an outdoor air supplied from the outdoor fan 97 by the outdoor heat exchanger 96, and further makes a heat exchange with an indoor air supplied from the indoor fan 97 by the indoor heat exchanger 93. Room cooling a heating is performed by an air after heat exchanger by the indoor heat exchanger 93. A switchover of cooling or heating is carved out by inverting a circulating direction of the refrigerant by the four-way valve 91. The circulation of refrigerant in the refrigeration cycle is performed by driving the compressor 82 by the inverter 81, and a supply of power to these inverter 81 and the compressor 82 is carried out using the power supply device of the first embodiment which functions as a converter. The construction and operation of the power supply device are as described before.

With the above construction, it is possible to restrict a harmonic distortion of an input current in an air conditioner. Further, it possible to provide a low-loss air conditioner having a small switching noise.

In this fifteenth embodiment, the power supply device of the first embodiment has been used as a converter. Even in the case where other power supply devices of the second to fourteenth embodiments are used, it is possible to provide an air conditioner having an effect of each power supply device.

For example, in the power supply device of the present invention, even if the AC power supply 1 provides 200V, as shown in the third embodiment, a harmonic distortion can be restricted, and a small-size reactor 3 can be realized. Therefore, it is possible to use the same reactor 3 as that used in the input of 100V.

As shown in the fourth embodiment, even if the AC power supply 1 is 100V, it is possible to obtain an output voltage higher than a voltage obtained by the voltage doubler rectification in addition to the restriction of harmonic. Therefore, even in the case of the input of 100V, it is possible to obtain the same output voltage as the input of 200V without providing the voltage double rectifier circuit. Further, as shown in the ninth to twelfth embodiments, a pulse width and tire control method of pulse signal are modified in accordance with a magnitude of load. Therefore, it is possible to obtain an optimum output voltage, power factor and efficiency in all load ranges.

The power supply device of this embodiment is applicable to any of 100V type and 200V type air conditioners and can restrict a harmonic distortion contained in an input current by the high power factor. Further, the power supply device has the following advantages. More specifically, the circuit construction and components can be used in common, and the number of processes and components can be greatly reduced.

Figure 28:
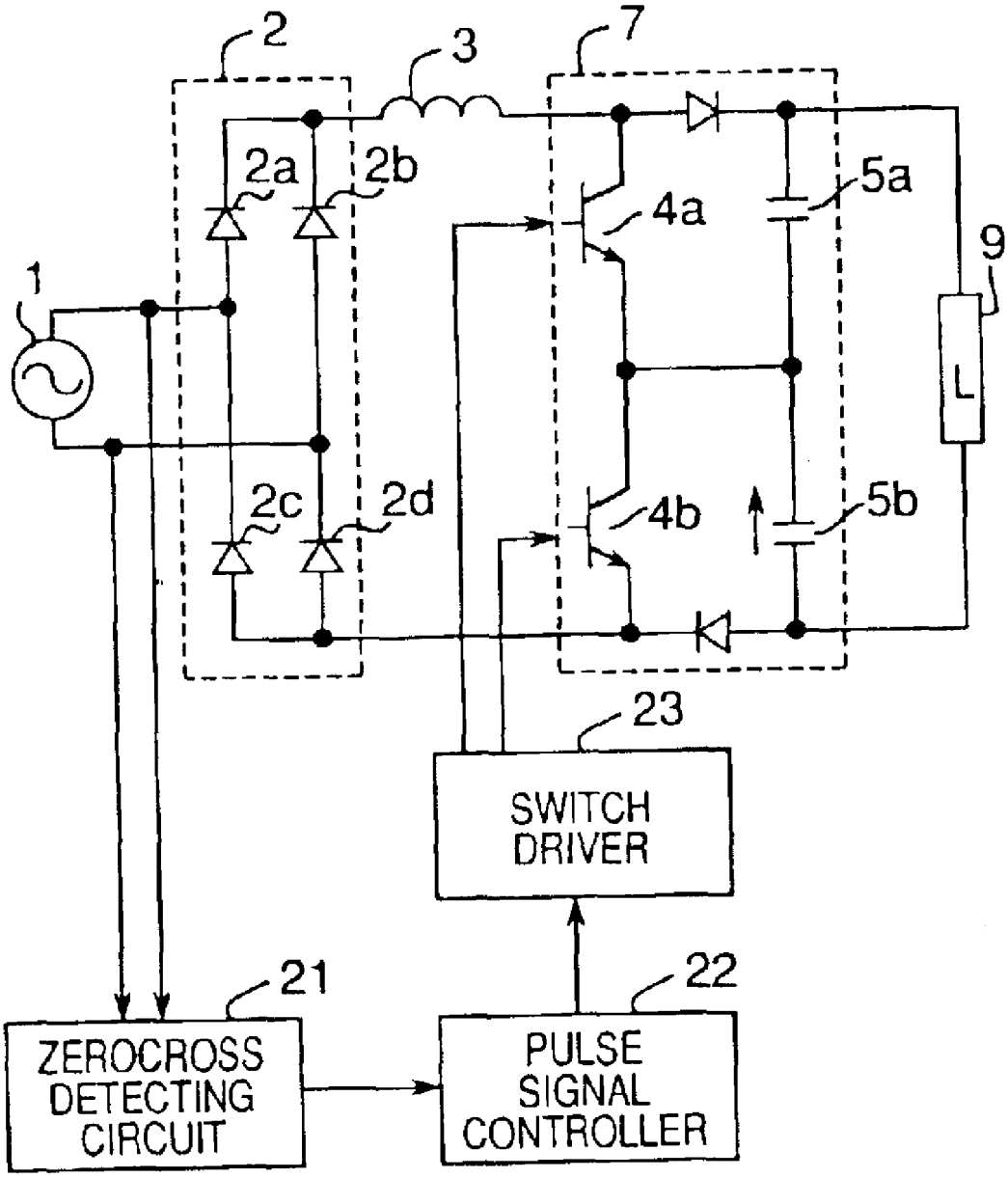
FIG. 28 is a view showing another construction of the power supply device of the present invention.
Figure 29A:
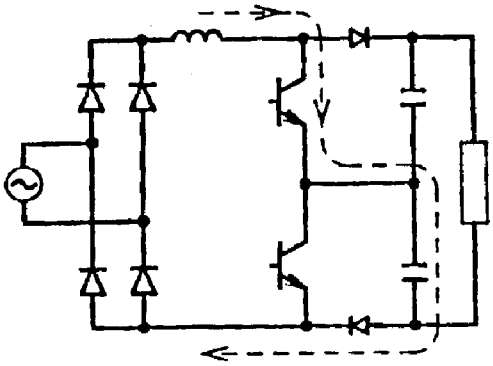
FIGS. 29A to 29D are views showing a current flow path in another example of the power supply device of the present invention.
Figure 29B:
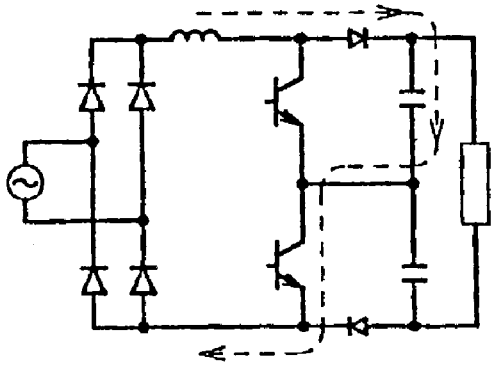
Figure 29C:
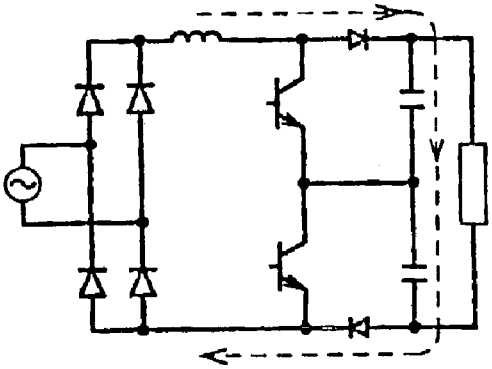
Figure 29D:
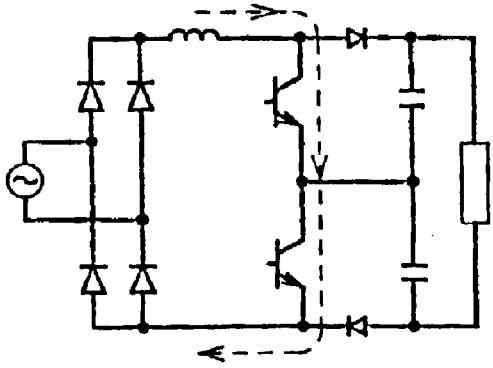
Figure 30:
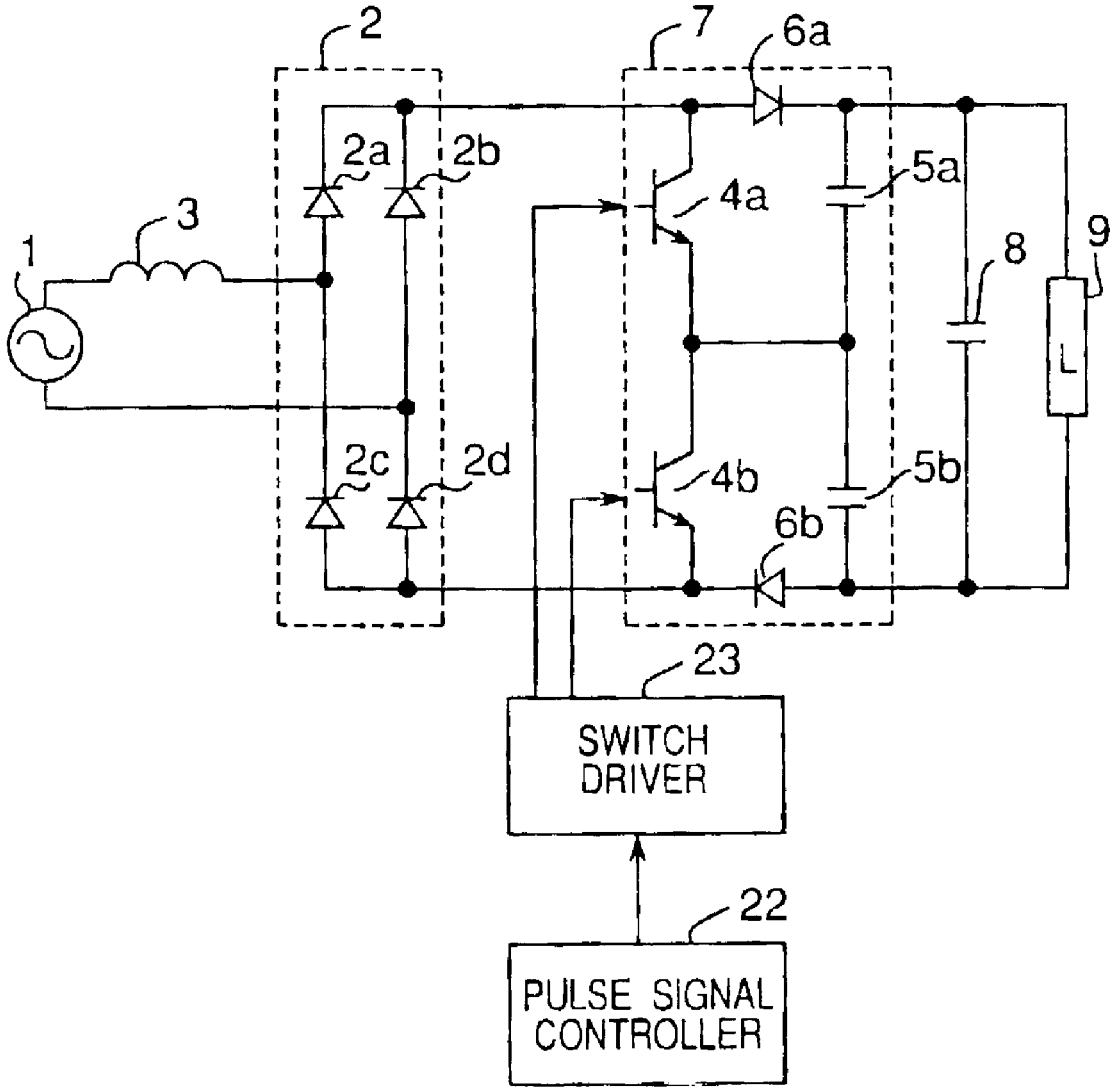
FIG. 30 is a view showing still another construction of the power supply device of the present invention.

In the power supply devices shown in the above first to fifteenth embodiments, the same advantages are provided as this embodiment by a circuit construction as shown in FIG. 28 of modifying a value of the capacitor 5a and 5b and omitting the smoothing capacitor 8. FIG. 29 shows a current flowing path in the circuit construction shown in FIG. 28. Further, in the power supply devices shown in the first to eleventh embodiments, the reactor 3 has been connected to a ripple output side of the rectifier circuit 2. As shown in FIG. 30, even in the case where the reactor 3 is connected to an AC input side of the rectifier circuit 2, the same advantages can be obtained.

Although the present invention has been described in connection with specified embodiments thereof, many other modifications, corrections and applications are apparent to those skilled in the art. Therefore, the present invention is not limited by the disclosure provided herein but limited only to the scope of the appended claims.

It also should be noted that this application is based on application No. 11-10155 filed in Japan, the contents of which is incorporated herein by reference.

What is claimed is:

[1. A power supply device comprising:

(a) a rectifier unit for rectifying an output voltage of an AC power supply to convert the voltage into a DC voltage;

(b) a reactor connected to the rectifier unit (c) a power factor correction unit for inputting an output voltage of the rectifier unit via the reactor, the power factor correction unit including a switching circuit comprising a plurality of switching elements connected in series and turning on or off to change a current path in the power factor correction unit, a capacitor circuit comprising a plurality of capacitors connected in series, and a reverse-current blocking rectifier element for preventing the charge in the capacitors from flowing reversely when the switching circuit turns on, the switching circuit and the capacitor circuit being arranged in parallel, at least one of connection nodes between the switching elements being connected to one connection node between the capacitors, ends of the switching circuit being connected to ends of the capacitor circuit via the reverse-current blocking rectifier element;

(d) a pulse signal controller for generating and outputting a pulse signal to stun on and off each switching element of the power factor correction unit; and (e) a switching driver for receiving the pulse signal to drive the switching circuit of the power factor correction unit based on the received pulse signal.]

[2. A power supply device comprising:

(a) a rectifier unit for rectifying an output voltage of an AC power supply to convert the voltage into a DC voltage;

(b) a reactor connected to the rectifier unit;

(c) a power factor correction taut for inputting an output voltage of the rectifier unit via the reactor, the power factor correction unit including a switching circuit comprising a plurality of switching elements connected in series and turning on or off to change a current path in the power factor correction unit a capacitor circuit comprising a plurality of capacitors connected in series, and a reverse-current blocking rectifier element for preventing the charge in the capacitors from flowing reversely when the switching circuit turns on, the switching circuit and the capacitor circuit being arranged in parallel, at least one of connection nodes between the switching elements being connected to one connection node between the capacitors, ends of the switching circuit being connected to ends of the capacitor circuit via the reverse-current blocking rectifier element;

(d) a pulse signal controller for generating and outputting a pulse signal to turn on and off each switching element of the power factor correction unit, the pulse signal controller outputting a pulse signal to turn on at least one of the plurality of switching elements of the power factor correction unit for a predetermined time in a half period of the AC power supply; and (e) a switching driver for receiving the pulse signal to drive the switching circuit of the power factor correction unit based on the received pulse signal.]

[3. The power supply device according to claim 2, further comprising a zero cross detecting unit for detecting a zero cross point of the power supply voltage to output a zero cross detection signal, wherein the pulse signal controller outputs a pulse signal for turning on the switching circuit of the power factor correction unit for a predetermined time based on the zero cross detection signal from the zero cross detecting unit.]

[4. The power supply device according to claim 2, wherein the pulse signal controller generates a pulse signal for turning on each switching element of the power factor correction unit for a predetermined time, and switches over an output pattern of the pulse signal for each half period of the AC power supply voltage.]

[5. The power supply device according to claim 2, wherein the pulse signal controller generates a pulse signal for turning on only one of switching elements of the power factor correction unit for a predetermined time, and switches over an output pattern of the pulse signal for each half period of the AC power supply voltage.]

[6. The power supply device according to claim 2, wherein the pulse signal controller generates a pulse, signal for turning on the plurality of switching elements of the power factor correction unit for different predetermined time, and switches over an output pattern of the pulse signal for each half period of the AC power supply voltage.]

[7. The power supply device according to claim 2, wherein the pulse signal controller generates a pulse signal for simultaneously turning on all switching elements of the power factor correction unit for a predetermined time, and outputs the pulse signal for each half period of the AC power supply voltage.]

[8. The power supply device according to claim 2, further comprising a zero cross detecting unit for detecting a zero cross point of the power supply voltage to output a zero cross detection signal, and a detection signal delay unit for receiving the zero cross signal from the zero cross detecting unit to output a zero cross delay signal from a predetermined time elapses, wherein the pulse signal controller receives the zero cross delay signal from the detection pulse delay unit, and then outputs a pulse signal for turning on at least one of the switching elements of the power factor correction unit for a predetermined time.]

[9. The power supply device according to claim 2 further comprising a power supply voltage detecting unit for detecting a voltage of the AC power supply, wherein when a voltage detected by the power supply voltage detecting unit becomes equal to or more than a predetermined value, the pulse signal controller outputs a pulse signal for turning on at least one of the switching elements of the power factor correction wit for a predetermined time.]

[10. The power supply device according to claim 2 further comprising a power supply voltage detecting unit for detecting a voltage of the AC power supply, and a DC voltage detecting unit for detecting a output voltage of the power supply device, wherein when the voltage detected by the power supply voltage detecting unit becomes equal to or more than a DC voltage detected by the DC voltage detecting unit, the poise signal controller outputs a pulse signal for turning off the switching elements of the power factor correction unit.]

[11. The power supply device according to claim 2 further comprising a load status detecting unit for detecting magnitude of a load, wherein the pulse signal controller changes a pulse width of the pulse signal in accordance with the magnitude of the load detected by the load status detecting unit, and then outputs the signal.]

[12. The power supply device according to claim 2 further comprising a load status detecting unit for detecting magnitude of a load, wherein the pulse signal controller selects one control method from a plurality of control methods for controlling the pulse signal to accordance with a magnitude of the load detected by the load status detecting unit, and then outputs the signal.]

[13. The power supply device according to claim 11, wherein the load comprises a motor and an inverter for providing a supply voltage to the motor, and the load status detecting unit detects a variation generated from a status transition of the inverter or the motor.]

[14. The power supply device according to claim 11, further comprising a supply voltage determining unit for determining a voltage of the AC supply, wherein the pulse signal controller switches over an output pattern of the pulse signal in accordance with the determining result by the supply voltage determining unit.]

[15. The power supply device according to claim 1 further comprising a power supply frequency detecting unit for detecting a frequency of the AC power supply voltage wherein the pulse signal controller outputs a pulse signal having different pulse width in accordance with a frequency detected by the power supply frequency detecting unit.]

[16. The power supply device according to claim 1, further comprising a smoothing capacitor for smoothing an output voltage of the power factor correction unit.]

[17. An air conditioner comprising a compressor for compressing a refrigerant, and a power supply devices according to claim 1 for providing supply voltage to the compressor.]

[18. The power supply device according to claim 12, wherein the load comprises a motor and an inverter for providing a supply voltage to the motor, and the load status detecting unit detects a variation generated from a status transition of the inverter or the motor.]

[19. The power supply device according to claim 12, further comprising a supply voltage determining unit for determining a voltage of the AC supply, wherein the pulse signal controller switches over an output pattern of the pulse signal in accordance with the determining result by the supply voltage determining unit.]

[20. The power supply device according to claim 2 further comprising a power supply frequency detecting unit for detecting a frequency of the AC power supply voltage, wherein the pulse signal controller outputs a pulse signal having different pulse width in accordance with a frequency detected by the power supply frequency detecting unit.]

[21. The power supply device according to claim 2, further comprising a smoothing capacitor for smoothing an output voltage of the power factor correction unit.]

[22. An air conditioner comprising a compressor for compressing a refrigerant, and a power supply devices according to claim 2 for providing supply voltage to the compressor.]

*23. A power supply device comprising:*

*(a) a rectifier that rectifies an output voltage of an AC power supply to convert he voltage into a DC voltage;*

(b) a reactor connected to the rectifier;

(c) a power factor corrector that inputs an output voltage of the rectifier via the reactor, the power factor corrector including a switching circuit comprising plurality of switching elements connected in series and turning on or off to change a current path in the power factor corrector, a capacitor circuit comprising a plurality of capacitors connected in series, and a reverse-current blocking rectifier element for preventing a charge in the capacitors from flowing reversely when the switching circuit turns on, the switching circuit and the capacitor circuit being arranged in parallel, at least one connection node between the switching elements being connected to a connection node between the capacitors, ends of the switching circuit being connected to ends of the capacitor circuit via the reverse-current blocking rectifier element;

(d) a pulse signal controller that generates and outputs a pulse signal to turn on and off each switching element of the power factor corrector;

(e) a switching driver that receives the pulse signal to drive the switching circuit of the power factor corrector based on the received pulse signal; and (f) a zero cross detector that detects a zero cross point of the power supply voltage to output a zero cross detection signal, wherein the pulse signal controller outputs a pulse signal to turn on at least one of the plurality of switching elements of the power factor corrector for a predetermined time in a half period of the AC power supply based on the zero cross detection signal from the zero cross detector.

24. The power supply device according to claim 23, wherein the pulse signal controller generates a pulse signal for turning on each switching element of the power factor corrector for a predetermined time, and switches over an output pattern of the pulse signal for each half period of the AC power supply voltage.

25. The power supply device according to claim 23, wherein the pulse signal controller generates a pulse signal for turning on only one of switching elements of the power factor corrector for a predetermined time, and switches over an output pattern of the pulse signal for each half period of the AC power supply voltage.

26. The power supply device according to claim 23, wherein the pulse signal controller generates a pulse signal for turning on the plurality of switching elements of the power factor corrector for different predetermined times, and switches over an output pattern of the pulse signal for each half period of the AC power supply voltage.

27. The power supply device according to claim 23, wherein the pulse signal controller generates a pulse signal for simultaneously turning on all switching elements of the power factor corrector for a predetermined time, and outputs the pulse signal for each half period of the AC power supply voltage.

28. The power supply device according to claim 23 further comprising a power supply, voltage detector that detects a voltage of the AC power supply, and a DC voltage detector that detects an output voltage of the power supply device, wherein when the voltage detected by the power supply voltage detector becomes equal to or more than a DC voltage detected by the DC voltage detector, the pulse signal controller outputs a pulse signal for turning off the switching elements of the power factor corrector.

29. The power supply device according to claim 23 further comprising a load status detector that detects a magnitude of a load, wherein the pulse signal controller changes a pulse width of the pulse signal in accordance with the magnitude of the load detected by the load status detector, and then outputs the signal.

30. The power supply device according to claim 23 further comprising a load status detector that detects a magnitude of a load, wherein the pulse signal controller selects one control method from a plurality of control methods for controlling the pulse signal in accordance with a magnitude of the load detected by the load status detector, and then outputs the signal.

31. The power supply device according claim 29, wherein the load comprises a motor and an inverter that provides a supply voltage to the motor, and the load status detector detects a variation generated from a status transition of one of the inverter and the motor.

32. The power supply device according to claim 29, further comprising a supply voltage determiner that determines a voltage of the AC supply, wherein the pulse signal controller switches over an output pattern of the pulse signal in accordance with the determining result by the supply voltage determiner.

33. The power supply device according to claim 23 further comprising a power supply frequency detector that detects a frequency of the AC power supply voltage, wherein the pulse signal controller outputs a pulse signal having different pulse width in accordance with a frequency detected by the power supply frequency detector.

34. The power supply device, according to claim 23, further comprising a smoothing capacitor for smoothing an output voltage of the power factor corrector.

35. The power supply device according to claim 30, wherein the load comprises a motor and an inverter that provides a supply voltage to the motor, and the load status detector detects a variation generated from a status transition of one of the inverter and the motor.

36. The power supply device according to claim 35, further comprising a supply voltage determiner that determines a voltage of the AC supply, wherein the pulse signal controller switches over an output pattern of the pulse signal in accordance with the determining result by the supply voltage determiner.

37. A power supply device comprising:

(a) a rectifier that rectifies an output voltage of an AC power supply to convert the voltage into a DC voltage;

(b) a reactor connected to the rectifier;

(c) a power factor corrector that inputs an output voltage of the rectifier via the reactor, the power factor corrector including a switching circuit comprising a plurality of switching elements connected in series and turning on or off to change a current path in the power factor corrector, a capacitor circuit comprising a plurality of capacitors connected in series, and a reverse-current blocking rectifier element for preventing a charge in the capacitors from flowing reversely when the switching circuit turns on, the switching circuit and the capacitor circuit being arranged in parallel, at least one connection node between the switching elements being connected to a connection node between the capacitors, ends of the switching circuit being connected to ends of the capacitor circuit via the reverse-current blocking rectifier element;

(d) a pulse signal controller for generating and outputting a pulse signal to turn on and off each switching element of the power factor corrector;

(e) a switching driver that receives the pulse signal to drive the switching circuit of the power factor corrector based on the received pulse signal;

(*f*) *a zero cross detector that detects a zero cross point of the power supply voltage to output a zero cross detection signal; and*

(*g*) *a detection signal delayer that receives the zero cross signal from the zero cross detector to output a zero cross delay signal after a predetermined, time elapses,*

*wherein the pulse signal controller receives the zero cross delay signal from the detection signal delayer, and then outputs a pulse signal for turning on at least one of the plurality of switching elements of the power factor corrector for a predetermined time in a half period of the AC power supply.*

*38. The power supply device according to claim 37, wherein the pulse signal controller generates a pulse signal for luring on each switching element of the power factor corrector for a predetermined time, and switches over an output pattern of the pulse signal for each half period of the AC power supply voltage.*

*39. The power supply device according to claim 37, wherein the pulse signal controller generates a pulse signal for turning on only one of switching elements of the power factor corrector for a predetermined time, and switches over an output pattern of the pulse signal for each half period of the AC power supply voltage.*

*40. The power supply device according to claim 37, wherein the pulse signal controller generates a pulse signal for turning on the plurality of switching elements of the power factor corrector for different predetermined times, and switches over an output pattern of the pulse signal for each half period of the AC power supply voltage.*

*41. The power supply device according to claim 37, wherein the pulse signal controller generates a pulse signal for simultaneously turning on all switching elements of the power factor corrector for a predetermined time, and outputs the pulse signal for each half period of the AC power supply voltage.*

*42. The power supply device, according to claim 37 further comprising a power supply frequency detector that detects a frequency of the AC power supply voltage wherein the pulse signal controller outputs a pulse signal having different pulse width in accordance with a frequency detected by the power supply frequency detector.*

*43. A power supply device comprising:*

(*a*) *a rectifier that rectifies an output voltage of an AC power supply to convert the voltage into a DC voltage;*

(*b*) *a reactor connected to the rectifier;*

(*c*) *a power factor corrector that inputs an output voltage of the rectifier via the reactor, the power factor corrector including a switching circuit comprising a plurality of switching elements connected in series and turning on or off to change a current path in the power factor corrector, a capacitor circuit comprising a plurality of capacitors connected in series, and a reverse-current blocking rectifier element for preventing a charge in the capacitors from flowing reversely when the switching circuit turns on, the switching circuit and the capacitor circuit being arranged in parallel, at least one connection node between the switching elements being connected to a connection node between the capacitors, ends of the switching circuit being connected to ends of the capacitor circuit via the reverse-current blocking rectifier element;*

(*d*) *a pulse signal controller for generating and outputting a pulse signal to turn on and off each switching element of the power factor corrector;*

(*e*) *a switching driver that receives the pulse signal to drive the switching circuit of the power factor corrector based on the received pulse signal;*

(*f*) *a power supply voltage detector that detects a voltage of the AC power supply,*

*wherein when a voltage detected by the power supply voltage detector becomes equal to or more than a predetermined value, the pulse signal controller outputs a pulse signal for turning on at least one of the switching elements of he power factor corrector for a predetermined time.*

*44. An air conditioner comprising a compressor for compressing a refrigerant, and a power supply device according to claim 23 for providing supply voltage to the compressor.*

*45. An air conditioner comprising a compressor for compressing a refrigerant, and a power supply device according to claim 37 for providing supply voltage to the compressor.*

* * * * *